United States Patent
Sprenger et al.

(10) Patent No.: US 12,449,496 B2
(45) Date of Patent: Oct. 21, 2025

(54) SYSTEMS AND METHODS FOR SLICE-AHEAD INVERSION FOR MAGNETIC RESONANCE IMAGING

(71) Applicant: GE Precision Healthcare LLC, Waukesha, WI (US)

(72) Inventors: Tim Sprenger, Bavaria (DE); Suchandrima Banerjee, Menlo Park, CA (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 148 days.

(21) Appl. No.: 18/427,455

(22) Filed: Jan. 30, 2024

(65) Prior Publication Data

US 2025/0244428 A1    Jul. 31, 2025

(51) Int. Cl.
*G01R 33/56* (2006.01)
*G01R 33/385* (2006.01)
*G01R 33/48* (2006.01)
*G01R 33/50* (2006.01)

(52) U.S. Cl.
CPC ....... *G01R 33/5608* (2013.01); *G01R 33/385* (2013.01); *G01R 33/4818* (2013.01); *G01R 33/50* (2013.01)

(58) Field of Classification Search
CPC .. G01R 33/385; G01R 33/4818; G01R 33/50; G01R 33/5608
See application file for complete search history.

(56) References Cited

U.S. PATENT DOCUMENTS

| | | | |
|---|---|---|---|
| 2016/0203603 A1* | 7/2016 | Li | G01R 33/56366 382/131 |
| 2021/0124000 A1* | 4/2021 | Guenther | G01R 33/56366 |
| 2022/0283255 A1* | 9/2022 | Takei | G01R 33/543 |

OTHER PUBLICATIONS

Sanchez Panchuelo, R. et al., "Quantitative T1 mapping using multi-slice multi-shot inversion recovery EPI," NeuroImage, vol. 234, Jul. 1, 2021, 19 pages.

\* cited by examiner

*Primary Examiner* — Gregory H Curran
(74) *Attorney, Agent, or Firm* — McCoy Russell LLP

(57) ABSTRACT

Systems and methods are provided for a slice-ahead inversion sequence for jointly acquiring non-inverted and inverted contrast. In one example, a method for a magnetic resonance imaging (MRI) system includes acquiring k-space data with the MRI system according to a slice-ahead inversion sequence that jointly generates a contrast without inversion preparation and one or more inversion contrasts for a plurality of slices in a scan volume of a subject, wherein the k-space data comprises first k-space data of the contrast without inversion preparation acquired during one or more non-inversion repetitions and second k-space data of the one or more inversion contrasts acquired during one or more inversion repetitions, wherein a repetition time for each of the one or more non-inversion repetitions and one or more inversion repetitions is constant, and reconstructing one or more images from the k-space data.

20 Claims, 16 Drawing Sheets

SYSTEMS AND METHODS FOR SLICE-AHEAD INVERSION FOR MAGNETIC RESONANCE IMAGING

TECHNICAL FIELD

The present description relates generally to medical imaging. More specifically, the present disclosure relates to magnetic resonance imaging.

BACKGROUND

Magnetic resonance imaging (MRI) is a medical imaging modality that can create images of the inside of a human body without using x-rays or other ionizing radiation. An MRI scan typically includes a series of radiofrequency (RF) excitation pulses and magnetic field gradient pulses that are played out with specific timings and in a specific sequence to prepare contrast and encode spatial information into the signal to generate an image.

BRIEF DESCRIPTION

In one example, a method for a magnetic resonance imaging (MRI) system includes acquiring k-space data with the MRI system according to a slice-ahead inversion sequence that jointly generates contrast without inversion preparation and one or more inversion contrasts for a plurality of slices in a scan volume of a subject, wherein the k-space data comprises first k-space data of the contrast without inversion preparation acquired during one or more non-inversion repetitions and second k-space data of the one or more inversion contrasts acquired during one or more inversion repetitions, wherein a repetition time for each of the one or more non-inversion repetitions and one or more inversion repetitions is constant, and reconstructing one or more images from the k-space data for each of the plurality of slices.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

Figure 1:
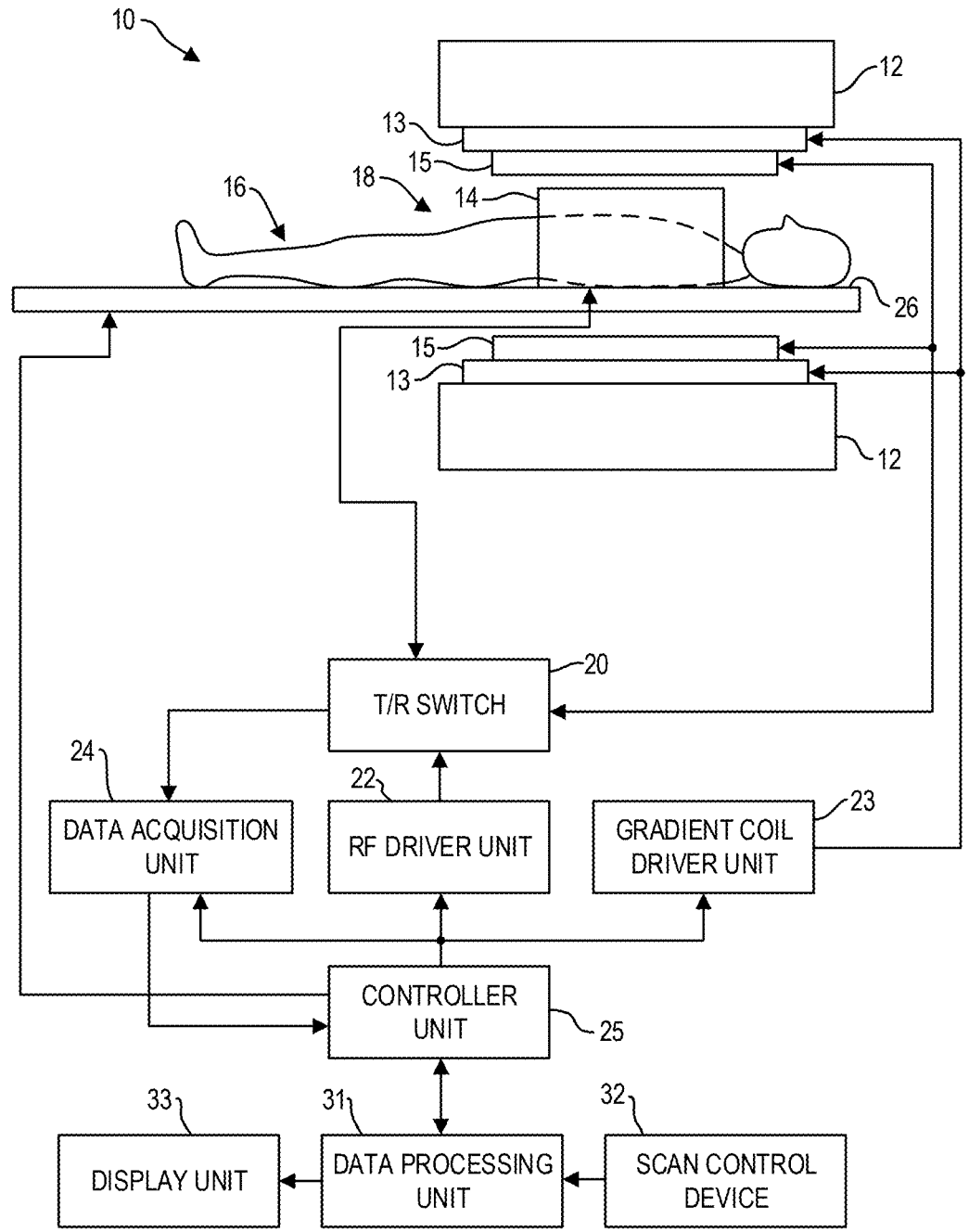
FIG. 1 is a block diagram of an MRI apparatus according to an embodiment of the disclosure.

The following description relates to magnetic resonance imaging (MRI) and particularly to a slice-ahead inversion sequence for obtaining inversion contrast images of a subject. Inversion preparation is a key instrument for T1 contrast acquisition in MRI. Inversion contrast is prepared with an inversion sequence (also referred to as an inversion recovery sequence) that typically includes a 180° inverting radiofrequency (RF) pulse that precedes a conventional spin echo sequence having a 90°-180°-echo sequence. The time between the inversion pulse and the 90° pulse of the spin echo sequence is referred to as the inversion time (TI). The inversion pulse flips the initial longitudinal magnetization ($M_0$) of all tissues in the imaged slice to point opposite to the direction of the main magnetic field ($B_0$). During the TI interval, these inverted tissues undergo T1 relaxation. When the spin echo sequence begins (at the 90° pulse), the initial longitudinal magnetizations of different tissues are separated based on their different intrinsic T1 relaxation times. The degree of image contrast may thereby be controlled by varying the TI. The use of inversion sequences to prepare inversion contrast may have various benefits, including increased T1 sensitivity, additive T1 and T2 contrast, and the ability to suppress signal from selected tissue.

To achieve a homogenous inversion contrast across the acquisition volume for 2D acquisitions, dummy repetitions (TRs) or inversion blocks are used, leading to considerable non-acquisition time. Dummy TRs may include one or more TRs where an inversion pulse(s) is applied but no signal acquisition occurs. If a second TI is needed, e.g., one for T2FLAIR and one for phase sensitive inversion recovery Tiw, a new dummy TR is required. Thus, inversion sequences may be time-consuming.

Thus, according to embodiments disclosed herein, inversion contrast may be prepared according to a new 2D slice-ahead inversion sequence where a first acquisition volume is acquired without inversion pulses (e.g., a T2 weighted volume), preparing for the acquisition of one or several inversion contrasts (with different TIs). Inversion pulses and imaging sequences (e.g., readouts) are interleaved such that k-space data is constantly acquired with only minimal non-acquisition time (e.g., during the inversion pulses), thereby shortening scan times by eliminating the need for dummy TRs. In some examples, the slice-ahead inversion sequence may include additional slice selective saturation bands to improve inversion homogeneity.

The slice-ahead inversion sequence disclosed herein may be used for generating flexible contrast mechanisms, such as rapid fast spin echo (FSE) or single-shot FSE (SSFSE) imaging with T2, T2 fluid attenuated inversion recovery (FLAIR), or phase sensitive T1, but also other TIs for white matter (WM) nulled or gray matter (GM) nulled contrast can be acquired (e.g., for single rapid sequences including multiple image contrast acquisitions such as NeuroMix). Contrary to e.g., fingerprinting, the complete inversion curve can be sampled including the WM and GM nulling points which may be key to identify early pathology. The slice-ahead inversion sequence can also be used for rapid T1 mapping by sampling the inversion curve with an arbitrary number of TIs. If adiabatic inversion pulses are used, the slice-ahead inversion sequence is very robust against Bi inhomogeneity. The slice-ahead inversion sequence could also be used to rapidly acquire diffusion weighted imaging (DWI) data at different TIs, adding T1 as another dimension for tissue modeling.

Figure 15:
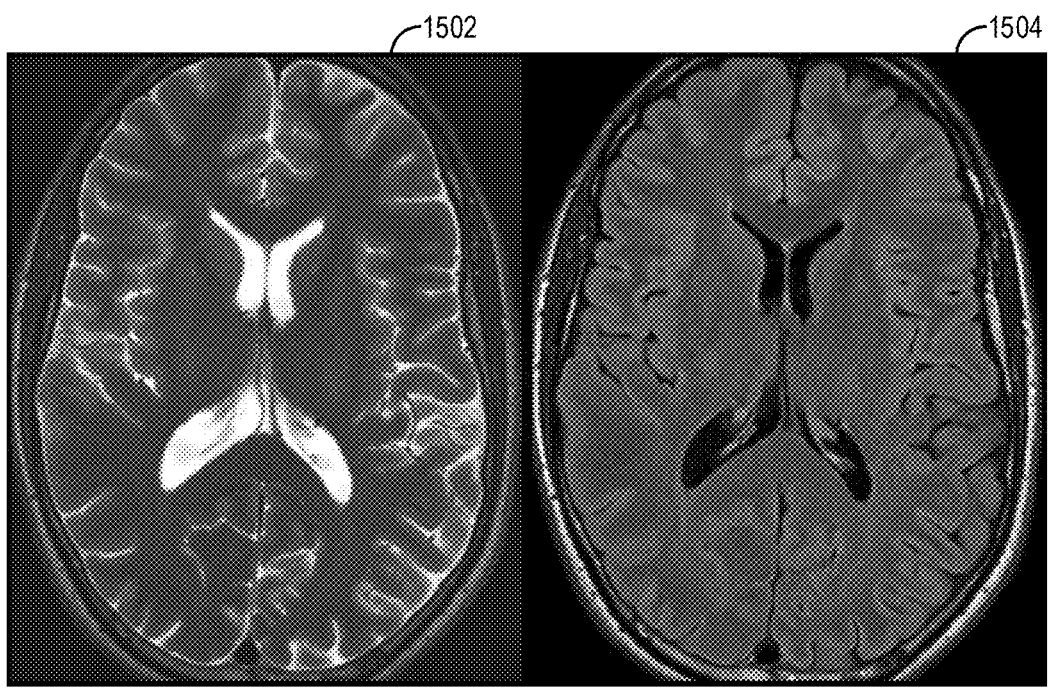
FIG. 15 shows example images reconstructed from k-space data acquired with the second example slice-ahead inversion sequence.
Figure 16:
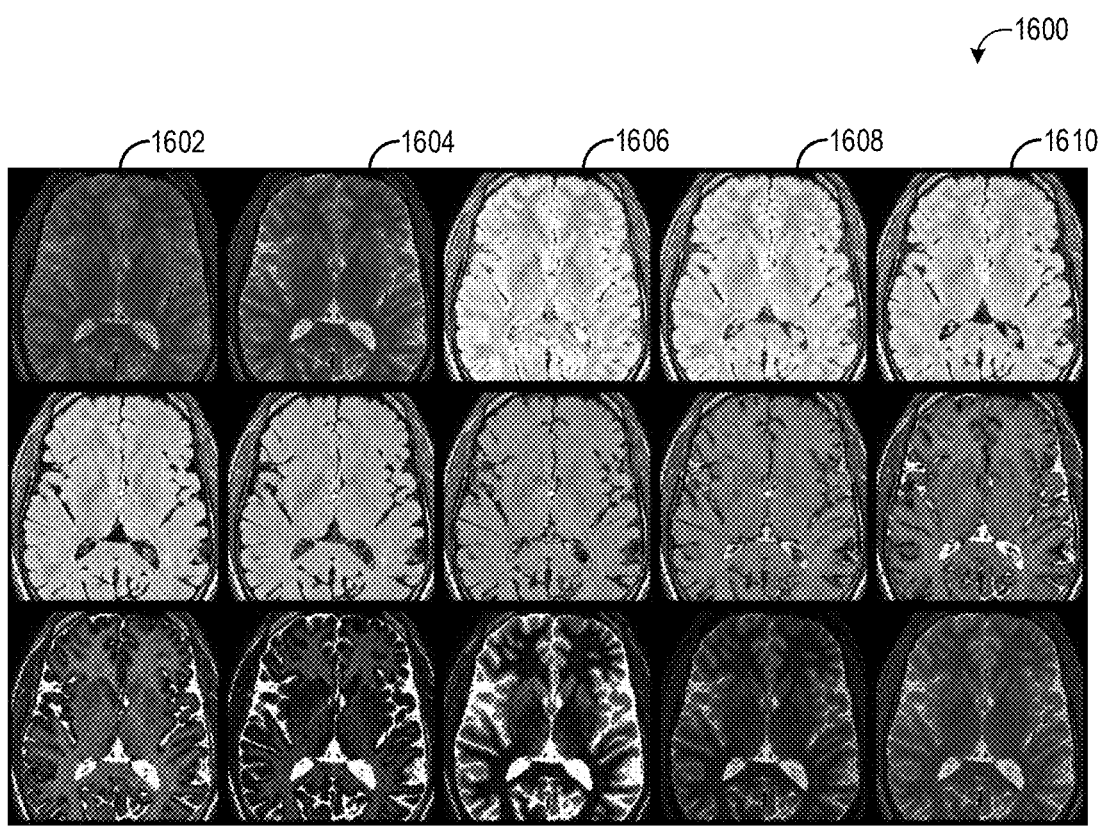
FIG. 16 shows example images reconstructed from k-space data acquired with the third example slice-ahead inversion sequence.

An example MRI apparatus that may be used to obtain MR signals of an imaging subject is shown in FIG. 1. The MRI apparatus may include a set of gradient coils configured to provide magnetic gradients along respective orthogonal directions, a radiofrequency (RF) system configured to transmit RF pulses and receive the MR signals of the imaging subject, a controller that may control the set of gradient coils and RF system to perform the slice-ahead inversion sequences disclosed herein. Example slice-ahead inversion sequences are illustrated in FIGS. 2-10, including slice plots for a first example slice-ahead inversion sequence shown in FIGS. 2 and 3; slice plots for a second example slice-ahead inversion sequence shown in FIG. 8; slice plots for a third example slice-ahead inversion sequence shown in FIGS. 9 and 10; and an example pulse sequence, imaging sequence, and saturation band sequence that may be performed as part of the slice-ahead inversion sequences disclosed herein shown in FIGS. 4-7. A high-level method for performing a slice-ahead inversion sequence is shown in FIG. 11, with example methods for performing the first, second, and third example slice-ahead inversion sequences shown in FIGS. 12, 13, and 14, respectively. Example images that may be reconstructed from the slice-ahead inversion sequences disclosed herein are shown in FIGS. 15 and 16.

FIG. 1 illustrates an MRI apparatus 10 (e.g., an MRI system) that includes a magnetostatic field magnet unit 12, a gradient coil unit 13, an RF coil unit 14, an RF body coil unit 15 (e.g., volume coil unit), a transmit/receive (T/R) switch 20, an RF driver unit 22, a gradient coil driver unit 23, a data acquisition unit 24, a controller unit 25, a patient bed or table 26, a data processing unit 31, a scan control device 32, and a display unit 33. In some embodiments, the RF coil unit 14 is a surface coil, which is a local coil typically placed proximate to the anatomy of interest of a subject 16. Herein, the RF body coil unit 15 is a transmit coil that transmits RF signals, and the local surface of the RF coil unit 14 receives the MR signals. As such, the transmit body coil (e.g., RF body coil unit 15) and the surface receive coil (e.g., RF coil unit 14) are separate but electromagnetically coupled components. The MRI apparatus 10 transmits electromagnetic pulse signals to the subject 16 placed in an imaging space 18 with a static magnetic field formed to perform a scan for obtaining magnetic resonance signals from the subject 16. One or more images of the subject 16 can be reconstructed based on the magnetic resonance signals thus obtained by the scan.

The magnetostatic field magnet unit 12 includes, for example, an annular superconducting magnet, which is mounted within a toroidal vacuum vessel. The magnet defines a cylindrical space surrounding the subject 16 and generates a constant primary magnetostatic field $B_0$.

The MRI apparatus 10 also includes a gradient coil unit 13 that forms a gradient magnetic field in the imaging space 18 so as to provide the magnetic resonance signals received by the RF coil arrays with three-dimensional positional information. The gradient coil unit 13 includes three gradient coil systems, each of which generates a gradient magnetic field along one of three spatial axes perpendicular to each other, and generates a gradient field in each of a frequency encoding direction, a phase encoding direction, and a slice selection direction in accordance with the imaging condition. More specifically, the gradient coil unit 13 applies a gradient field in the slice selection direction (or scan direction) of the subject 16, to select the slice; and the RF body coil unit 15 or the local RF coil arrays may transmit an RF pulse to a selected slice of the subject 16. The gradient coil unit 13 also applies a gradient field in the phase encoding direction of the subject 16 to phase encode the magnetic resonance signals from the slice excited by the RF pulse. The gradient coil unit 13 then applies a gradient field in the frequency encoding direction of the subject 16 to frequency encode the magnetic resonance signals from the slice excited by the RF pulse.

The RF coil unit 14 is disposed, for example, to enclose the region to be imaged of the subject 16. In some examples, the RF coil unit 14 may be referred to as the surface coil or the receive coil. In the static magnetic field space or imaging space 18 where a static magnetic field $B_0$ is formed by the magnetostatic field magnet unit 12, the RF body coil unit 15 transmits, based on a control signal from the controller unit 25, an RF pulse that is an electromagnet wave to the subject 16 and thereby generates a high-frequency magnetic field $B_1$. This excites a spin of protons in the slice to be imaged of the subject 16. The RF coil unit 14 receives, as a magnetic resonance signal, the electromagnetic wave generated when the proton spin thus excited in the slice to be imaged of the subject 16 returns into alignment with the initial magnetization vector. In some embodiments, the RF coil unit 14 may transmit the RF pulse and receive the MR signal. In other embodiments, the RF coil unit 14 may only be used for receiving the MR signals, but not transmitting the RF pulse.

The RF body coil unit 15 is disposed, for example, to enclose the imaging space 18, and produces RF magnetic field pulses orthogonal to the main magnetic field $B_0$ produced by the magnetostatic field magnet unit 12 within the imaging space 18 to excite the nuclei. In contrast to the RF coil unit 14, which may be disconnected from the MRI apparatus 10 and replaced with another RF coil unit, the RF body coil unit 15 is fixedly attached and connected to the MRI apparatus 10. Furthermore, whereas local coils such as the RF coil unit 14 can transmit to or receive signals from only a localized region of the subject 16, the RF body coil unit 15 generally has a larger coverage area. The RF body coil unit 15 may be used to transmit or receive signals to the whole body of the subject 16, for example. Using receive-only local coils and transmit body coils provides a uniform RF excitation and good image uniformity at the expense of high RF power deposited in the subject. For a transmit-receive local coil, the local coil provides the RF excitation to the region of interest and receives the MR signal, thereby decreasing the RF power deposited in the subject. It should be appreciated that the particular use of the RF coil unit 14 and/or the RF body coil unit 15 depends on the imaging application.

The T/R switch 20 can selectively electrically connect the RF body coil unit 15 to the data acquisition unit 24 when operating in receive mode, and to the RF driver unit 22 when operating in transmit mode. Similarly, the T/R switch 20 can selectively electrically connect the RF coil unit 14 to the data acquisition unit 24 when the RF coil unit 14 operates in receive mode, and to the RF driver unit 22 when operating in transmit mode. When the RF coil unit 14 and the RF body coil unit 15 are both used in a single scan, for example if the RF coil unit 14 is configured to receive MR signals and the RF body coil unit 15 is configured to transmit RF signals, then the T/R switch 20 may direct control signals from the RF driver unit 22 to the RF body coil unit 15 while directing received MR signals from the RF coil unit 14 to the data acquisition unit 24. The coils of the RF body coil unit 15 may be configured to operate in a transmit-only mode or a transmit-receive mode. The coils of the RF coil unit 14 may be configured to operate in a transmit-receive mode or a receive-only mode.

The RF driver unit 22 includes a gate modulator (not shown), an RF power amplifier (not shown), and an RF oscillator (not shown) that are used to drive the RF coils (e.g., RF body coil unit 15) and form a high-frequency magnetic field in the imaging space 18. The RF driver unit 22 modulates, based on a control signal from the controller unit 25 and using the gate modulator, the RF signal received from the RF oscillator into a signal of predetermined timing having a predetermined envelope. The RF signal modulated by the gate modulator is amplified by the RF power amplifier and then output to the RF body coil unit 15.

The gradient coil driver unit 23 drives the gradient coil unit 13 based on a control signal from the controller unit 25 and thereby generates a gradient magnetic field in the imaging space 18. The gradient coil driver unit 23 includes three systems of driver circuits (not shown) corresponding to the three gradient coil systems included in the gradient coil unit 13.

The data acquisition unit 24 includes a pre-amplifier (not shown), a phase detector (not shown), and an analog/digital converter (not shown) used to acquire the magnetic resonance signals received by the RF coil unit 14. In the data acquisition unit 24, the phase detector phase detects, using the output from the RF oscillator of the RF driver unit 22 as a reference signal, the magnetic resonance signals received from the RF coil unit 14 and amplified by the pre-amplifier, and outputs the phase-detected analog magnetic resonance signals to the analog/digital converter for conversion into digital signals. The digital signals thus obtained are output to the data processing unit 31.

The MRI apparatus 10 includes a table 26 for placing the subject 16 thereon. The subject 16 may be moved inside and outside the imaging space 18 by moving the table 26 based on control signals from the controller unit 25.

The controller unit 25 includes a computer and a recording medium on which a program to be executed by the computer is recorded. The program when executed by the computer causes various parts of the apparatus to carry out operations corresponding to pre-determined scanning. The recording medium may comprise, for example, a ROM, flexible disk, hard disk, optical disk, magneto-optical disk, CD-ROM, or non-volatile memory card. The controller unit 25 is connected to the scan control device 32 and processes the operation signals input to the scan control device 32 and furthermore controls the table 26, RF driver unit 22, gradient coil driver unit 23, and data acquisition unit 24 by outputting control signals to them. The controller unit 25 also controls, to obtain a desired image, the data processing unit 31 and the display unit 33 based on operation signals received from the scan control device 32.

The scan control device 32 includes user input devices such as a touchscreen, keyboard and a mouse. The scan control device 32 is used by an operator, for example, to input such data as an imaging protocol and to set a region where an imaging sequence is to be executed. The data about the imaging protocol and the imaging sequence execution region are output to the controller unit 25.

The data processing unit 31 includes a computer and a recording medium on which a program to be executed by the computer to perform predetermined data processing is recorded. The data processing unit 31 is connected to the controller unit 25 and performs data processing based on control signals received from the controller unit 25. The data processing unit 31 is also connected to the data acquisition unit 24 and generates spectrum data by applying various image processing operations to the magnetic resonance signals output from the data acquisition unit 24.

The display unit 33 includes a display device and displays an image on the display screen of the display device based on control signals received from the controller unit 25. The display unit 33 displays, for example, an image regarding an input item about which the operator inputs operation data from the scan control device 32. The display unit 33 also displays a two-dimensional (2D) slice image or three-dimensional (3D) image of the subject 16 generated by the data processing unit 31.

During an MRI scan using the MRI apparatus 10, a subject may be positioned within the imaging space 18 and an acquisition protocol may be carried out to obtain MR signals of the subject. The acquisition protocol may include a plurality of pulse sequences where in each pulse sequence, contrast is prepared via one or more RF pulses applied by the RF body coil unit 15 and the gradient coil unit 13 is controlled to spatially encode the resultant MR signals. The spatially-encoded MR signals are received by the RF coil unit 14 are digitized and stored in k-space. Thus, k-space data or a k-space dataset may refer to the raw MR signals prior to processing into an image. In some examples, one line of k-space may be filled with the raw MR signals per pulse sequence (also referred to as repetition time). In other examples, one line of k-space may be filled with the raw MR signals per echo, where more than one echo is generated per pulse sequence/repetition time. The k-space data may also be referred to as imaging data or MR data herein.

Figure 2:
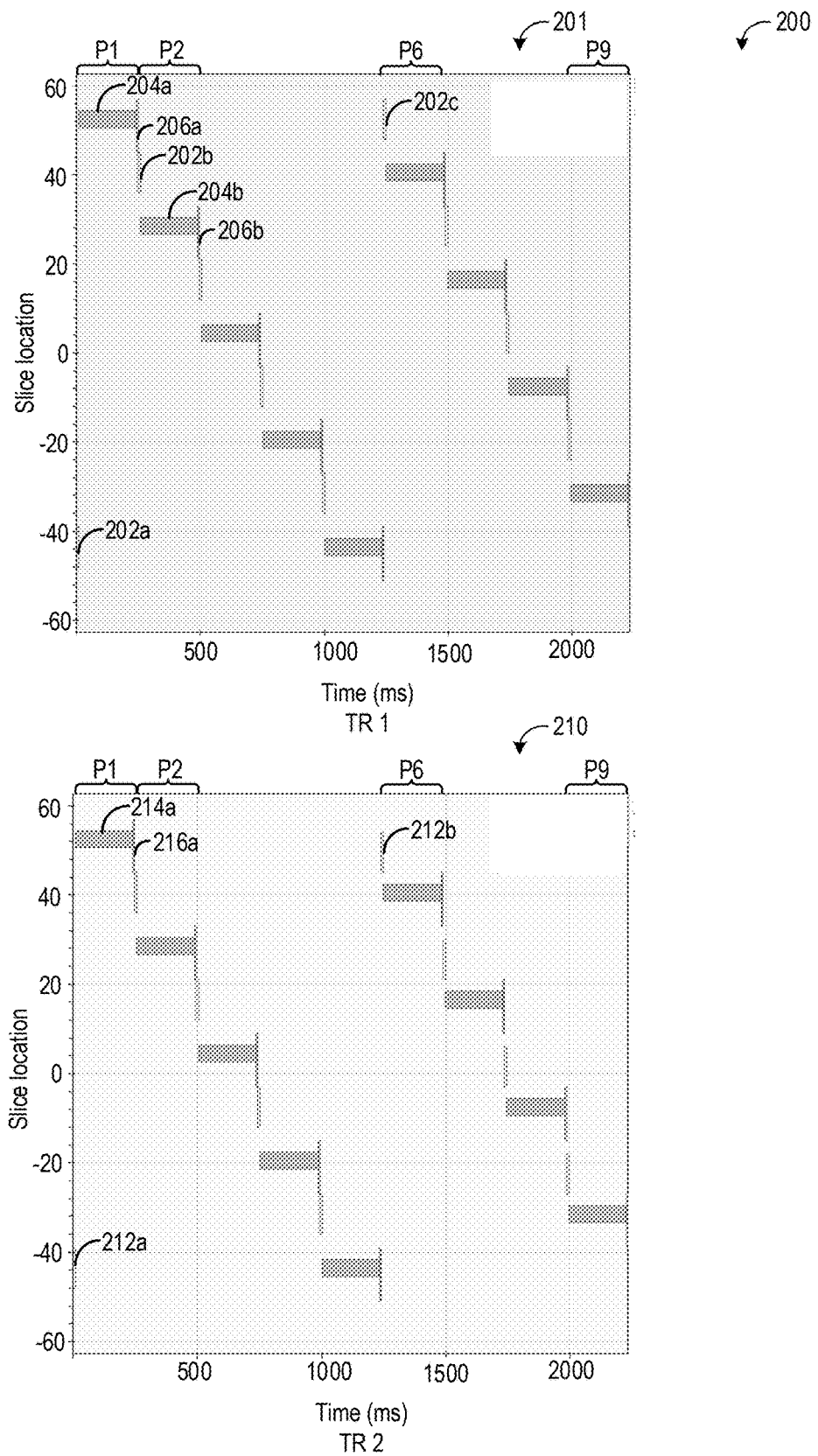
FIGS. 2 and 3 show example slice plots for a first repetition, a second repetition, and a final repetition of a first example slice-ahead inversion sequence.

FIG. 2 includes a set of slice plots 200 illustrating a first example slice-ahead inversion sequence that may be performed by an MRI system (e.g., the MRI apparatus 10 of FIG. 1) to jointly acquire a non-inversion contrast (herein, T2 contrast) and inversion contrast for a scan volume comprising N slices. In the example shown in FIG. 2, the inversion contrast is T1 FLAIR. The set of slice plots 200 includes a first slice plot 201 showing playouts of a first repetition (TR1) and a second slice plot 210 showing playouts of a second repetition (TR2). For each of the slice plots shown in FIG. 2, time is depicted along the horizontal axis (e.g., x-axis) and relative slice location is depicted along the vertical axis (e.g., y-axis). The relative slice location may be relative to a center location represented by 0 (e.g., the isocenter of the bore of the MRI apparatus), with slice locations extending in two directions (positive and negative) from the center.

TR1 and TR2 of the first example slice-ahead inversion sequence each includes nine playouts, including a first playout (P1), a second playout (P2), and on up to the ninth playout (P9). In the example shown in FIG. 2, nine slices are imaged in each TR1 and TR2 (e.g., the same nine slices are imaged in each TR), which may include a subset of all the N slices of the scan volume imaged according to the first example slice-ahead inversion sequence. Further slices of the volume are imaged in later TRs, as explained in more detail below. In the example shown, the first example slice-ahead inversion sequence may be carried out with a slice acquisition order of 1, 9, 17, 25, 33, 5, 13, 21, and 29 for TR1 and TR2; 2, 10, 18, 26, 34, 6, 14, 22, and 30 for TR3; 3, 11, 19, 27, 35, 7, 15, 23, and 31 for TR4; and 4, 12, 20, 28, 36, 8, 16, 24, and 32 for TR5. However, the acquisition order is exemplary and other orders may be used that image more or fewer slices per TR.

Each playout of TR1 includes an inversion sequence 202, an imaging sequence 204, and a saturation band sequence 206 (example sequences of which are shown in FIGS. 4-7 and explained in more detail below), performed in that order. Each inversion sequence, imaging sequence, and saturation band sequence may be slice-selective, with each inversion pulse acting on a different slice than is imaged during that playout. For example, for the first playout (P1) of TR1, a first inversion sequence 202a is performed, a first imaging sequence 204a is performed, and a first saturation band sequence 206a is performed. During the first imaging sequence 204a, the MRI system (e.g., the MRI apparatus 10) acquires k-space data that is usable to reconstruct an image of the slice acted on by the first imaging sequence 204a. The first saturation band sequence 206a may act to terminate magnetization in the imaged slice, which may improve inversion homogeneity. Thus, the first imaging sequence 204a may act on (e.g., image) a first slice of the acquisition order (e.g., which is slice 1, centered around slice location 52) and the first saturation band sequence 206a may also act on (e.g., terminate the magnetization of) the first slice. The first saturation band sequence 206a is parallel to the imaged slice (e.g., the first slice) and may be centered around the imaged slice or centered around a different slice of the volume. As shown, the first saturation band sequence 206a is shifted toward the center/bottom to improve the transition from slice group to slice group. The first inversion sequence 202a may include an RF inversion pulse that prepares magnetization for a subsequent inversion recovery imaging sequence. As such, the first inversion sequence 202a may act on a later slice in the slice-acquisition order (e.g., the fifth slice in the acquisition order, slice 33) that is imaged during a later playout of TR1 (e.g., the fifth playout).

For the second playout (P2) of TR1, a second inversion sequence 202b, a second imaging sequence 204b, and a second saturation band sequence 206b are performed. The second imaging sequence 204b and the second saturation band sequence 206b act on the second slice of the acquisition order (slice 9) while the second inversion sequence 202b may act on a different slice (the sixth slice in the acquisition order, slice 5) that is imaged during a later playout of TR1 (e.g., during the sixth playout). The third playout of TR1 includes an imaging sequence and a saturation band sequence that act on the third slice of the acquisition order (e.g., slice 17) and an inversion sequence that acts on the seventh slice of the acquisition order (e.g., slice 13); the fourth playout of TR1 includes an imaging sequence and a saturation band sequence that act on the fourth slice of the acquisition order (e.g., slice 25) and an inversion sequence that acts on the eighth slice of the acquisition order (e.g., slice 21); the fifth playout of TR1 includes an imaging sequence and a saturation band sequence that act on the fifth slice of the acquisition order (e.g., slice 33) and an inversion sequence that acts on the ninth slice of the acquisition order (e.g., slice 29).

Part way through TR1, the inversion sequences start to act on slices that will be imaged in TR2. For example, during the sixth playout, a third inversion sequence 202c is performed that acts on the first slice of the acquisition order (e.g., slice 1), but the first slice is not imaged again in TR1 but is imaged in TR2 (explained below). Similarly, for the remaining playouts of TR1 (e.g., the seventh, eighth, and ninth playouts), slice-selective imaging sequences and saturation band sequences are performed (on the seventh, eighth, and ninth slices of the acquisition order) and slice-selective inversion sequences are performed for slices imaged in TR2 (for the second, third, and fourth slices of the acquisition order).

Because each inversion sequence acts on a later slice in the acquisition order, a subset of the slices that are imaged in TR1 are imaged without an earlier inversion sequence acting on those slices. For example, the first inversion sequence 202a acts on slice 33, which is imaged during the fifth playout. Thus, the initial slices imaged in TR1 (e.g., the slices imaged in the first four playouts) are imaged as the slices are exhibiting a non-inverted contrast (e.g., T2 contrast), and the remaining slices (e.g., imaged in the last five playouts) are imaged as the slices are exhibiting inversion contrast, herein T1FLAIR due to the inversion time (TI) being a first inversion time of approximately 1000 ms (e.g., wherein TI is the time between an inversion sequence and when the slice the inversion sequence acts on is imaged). Thus, at least in some examples, TR1 may be a non-inversion repetition where at least some k-space data is acquired of non-inversion contrast.

It is to be appreciated that following conclusion of the first inversion sequence 202a, the first imaging sequence 204a is performed immediately and without delay. For example, the first inversion sequence 202a may end at approximately 10 ms following initiation of TR1 and the first imaging sequence 204a may begin at approximately 10 ms following the initiation of TR1. The first imaging sequence 204a may end at approximately 360 ms following the initiation of TR1 and the first saturation band sequence 206a may begin at approximately 360 ms following the initiation of TR1 and have a duration of approximately 6 ms. The second inversion sequence 202b may begin immediately after conclusion of the first saturation band sequence 206a, and thus may begin at approximately 366 ms following the initiation of TR1. In this way, imaging sequences are performed for nearly the entirety of TR1, other than when the inversion sequences and saturation band sequences are being performed.

Similar to TR1, TR2 includes a plurality of slice-selective imaging sequences, saturation band sequences, and inversion sequences performed across a plurality of playouts (e.g., nine) with each playout including an inversion sequence (wherein magnetization for a subsequent inversion recovery imaging sequence is prepped), an imaging sequence (wherein k-space data for reconstructing an image is acquired), and a saturation band sequence (wherein magnetization is terminated), with the imaging sequence and the saturation band sequence acting on the same slice and the inversion sequence acting on a different slice. For example, the first playout (P1) includes a first inversion sequence 212a, a first imaging sequence 214a, and a first saturation band sequence 216a, with each of the first imaging sequence 214a and the first saturation band sequence 216a acting on the first slice of the acquisition order (slice 1) and the first inversion sequence 212a acting on a different, later slice (e.g., the fifth slice of the acquisition order). Because the first slice of the acquisition order was acted on by the third inversion sequence 202c of TR1, the first imaging sequence 214a obtains k-space data of the first slice while the first slice is exhibiting the inversion contrast. As such, the first slice is imaged with both non-inversion contrast (e.g., T2 contrast) and inversion contrast (e.g., T1FLAIR contrast) across TR1 and TR2. The remaining playouts of TR2 are similar to the first playout (e.g., in that they each include an inversion sequence, an imaging sequence, and a saturation band sequence) and act on the same slices as in TR1. However, starting at the sixth playout (P6), the inversion sequences act on slices that will be imaged in TR3, which includes slices not imaged in TR1 and TR2. For example, a second inversion sequence 212b acts on slice 2, which is adjacent slice 1 in slice location. Accordingly, the inversion sequences for playouts 6-9 are shifted in order to invert slices 2, 10, 18, and 26, for example. Thus, at least in some examples, TR2 may be an inversion repetition where k-space data is acquired of an inversion contrast.

As appreciated from FIG. 2, each imaging sequence of TR1 and TR2 may act only on the specified slice. For example, the first imaging sequence 204a of TR1 only acts on slice 1 and the second imaging sequence 204b of TR1 only acts on slice 5. However, each inversion sequence may have a slice thickness that is greater than a thickness of each slice/greater than the slice thickness of each imaging sequence, such that each inversion sequence acts on a selected slice but also portions of adjacent slices. For example, each inversion pulse may have a slice thickness that is twice as thick as the slice thickness of the imaging sequences and may be centered around the selected slice. As an example, the second inversion sequence 202b of TR1 acts on slice 5 (that is imaged during P6) and has a thickness centered at slice 5 but that spans a part of slice 4 and a part of slice 6. Similarly, each saturation band sequence has a slice thickness that is greater than the slice thickness of each imaging sequence, and is centered around the slice that the saturation band sequence acts on, though in some examples, the saturation band sequence may be centered around a different slice of the scan volume.

TR3, TR4, and TR5 may be performed to image each remaining slice in the order specified by the acquisition order. Because each slice imaged in TR3, TR4, and TR5 is inverted by an earlier inversion sequence (whether in an earlier TR or that TR), only one TR is performed for each remaining subset of slices of the acquisition order. Said another way, for the first subset of slices that are imaged in TR1, two TRs are performed in order to prepare inversion contrast and image the first subset of slices. However, because inversion contrast preparation for the second subset of slices can begin in TR2, two separate TRs are not needed for the second subset of slices, third subset of slices, or fourth subset of slices. For the final TR of the first example slice-ahead inversion sequence (TR5 in this particular example), only some inversion pulses are performed and the saturation band sequences are deactivated, as no further slices are left to image.

Figure 3:
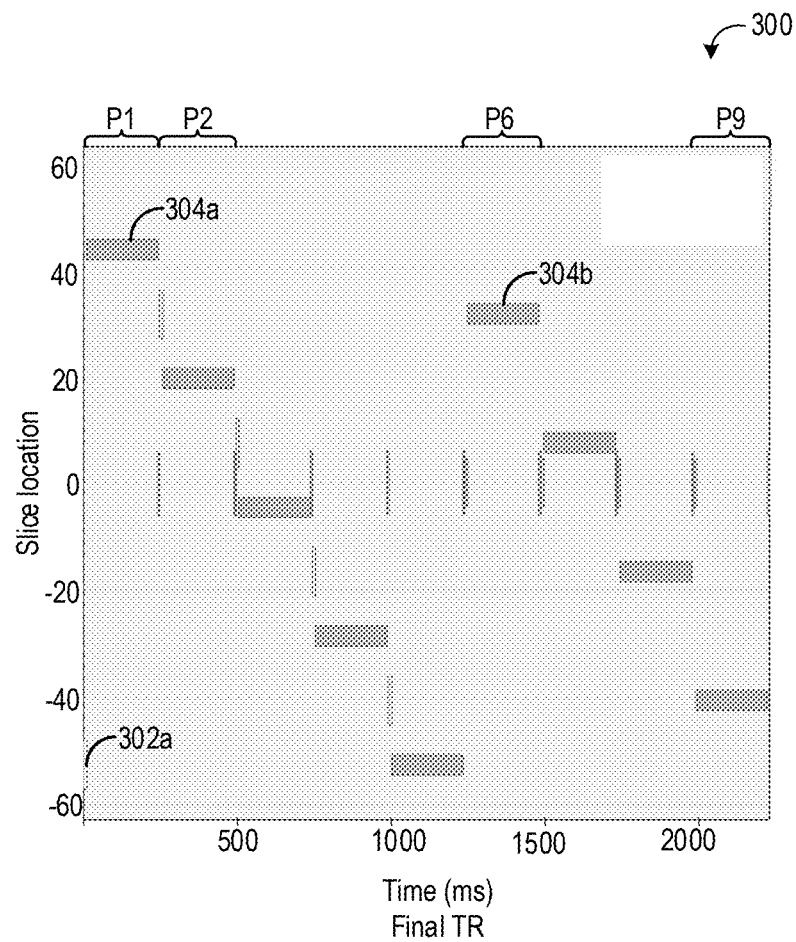

A final TR of the first example slice-ahead inversion sequence in shown in FIG. 3. Specifically, FIG. 3 shows a third slice plot 300 with a plurality of playouts (e.g., nine) to image a final subset of slices of the acquisition order (e.g., slices 4, 12, 20, 28, 36, 8, 16, 24, and 32). Each playout of the final TR (e.g., TR5) includes an imaging sequence. Further, a first portion of the playouts additionally includes an inversion sequence. For example, the first playout includes a first inversion sequence 302a and a first imaging sequence 304a. No saturation band sequences are performed in the final TR (e.g., the saturation band sequences are deactivated, which is shown somewhat schematically by the marks centered at slice location 0). The second, third, fourth, and fifth playouts likewise include an inversion sequence and an imaging sequence. The inversion sequence of the fifth playout acts on the final slice of the slice acquisition order, and thus the inversion pulses are deactivated for the sixth, seventh, eighth, and ninth playouts. For example, the sixth playout of the final TR includes only a second imaging sequence 304b. It is to be appreciated that each repetition of the slice-ahead inversion sequence shown in FIGS. 2 and 3 has the same duration, such that a repetition time of the non-inversion repetition (TR1) and inversion repetitions (e.g., TR2, TR3, TR4, and TR5) is constant.

Figure 4:
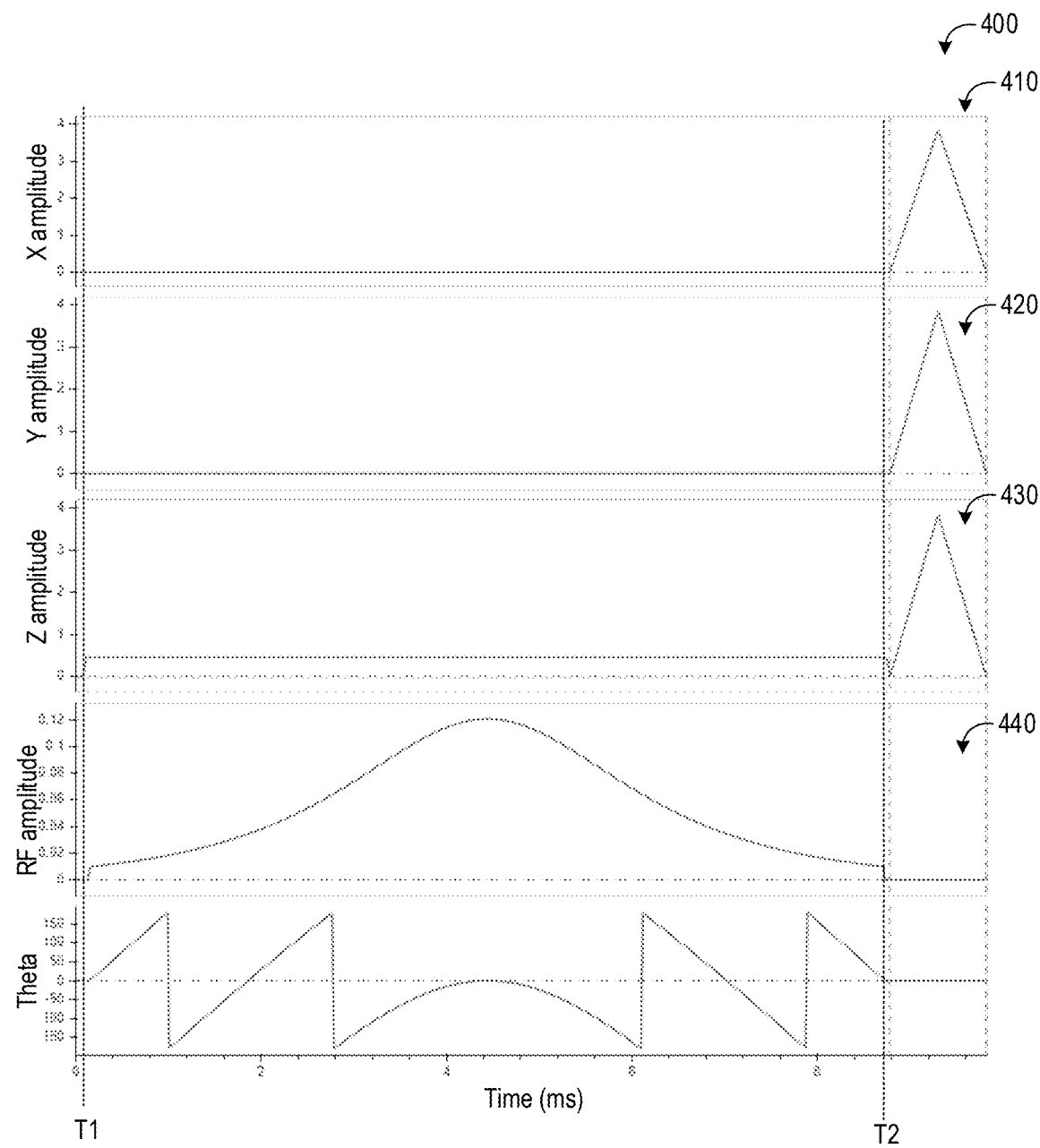
FIG. 4 shows an example inversion pulse sequence that may be carried out as part of the first example slice-ahead inversion sequence.

FIG. 4 shows an example pulse sequence diagram 400 for an inversion sequence of the slice-ahead inversion sequences disclosed herein. For example, any of the inversion sequences of FIGS. 2 and 3 may be carried out according to the example pulse sequence diagram 400. Pulse sequence diagram 400 includes a first plot 410 showing amplitude of the readout/frequency encoding gradient (e.g., along the read-out axis, X) over time, a second plot 420 showing the amplitude of the phase encoding gradient (e.g., along the phase-encode axis, Y) over time, a third plot 430 showing the amplitude of the slice selection gradient (e.g., along the slice-select axis, Z) over time, a fourth plot 440 showing RF amplitude as transmitted by RF transmitter coil(s) (e.g., the RF body coil unit 15) over time, and a fifth plot 450 showing phase modulation (e.g., of the RF pulse, labeled Theta) over time. In some examples, the gradient coil unit 13 may be controlled to generate the gradients shown in FIG. 4.

At time T1, the slice-selection gradient (e.g., the Z axis gradient) is controlled to apply a slice-selection gradient which acts on the selected slice, as shown by the third plot 430. For example, referring back to FIG. 2, the first playout of the first repetition TR1 includes a first inversion sequence 202a that acts on slice 33. Thus, the slice-selection gradient of the first inversion sequence 202a may act on slice 33. Immediately after T1, an RF pulse is applied until time T2, as shown by the fourth plot 440. The RF pulse may have a hyperbolic secant shape and a flip angle of 180° and may be an adiabatic pulse (e.g., as shown by the phase modulation). However, other inversion sequences may be used without departing from the scope of the disclosure, such as inversion sequences without an adiabatic RF pulse. The slice-selection gradient is deactivated after time T2, and a spoiler gradient is performed in each of the frequency, phase, and slice-selection gradients to thereby terminate the inversion pulse.

Figure 5:
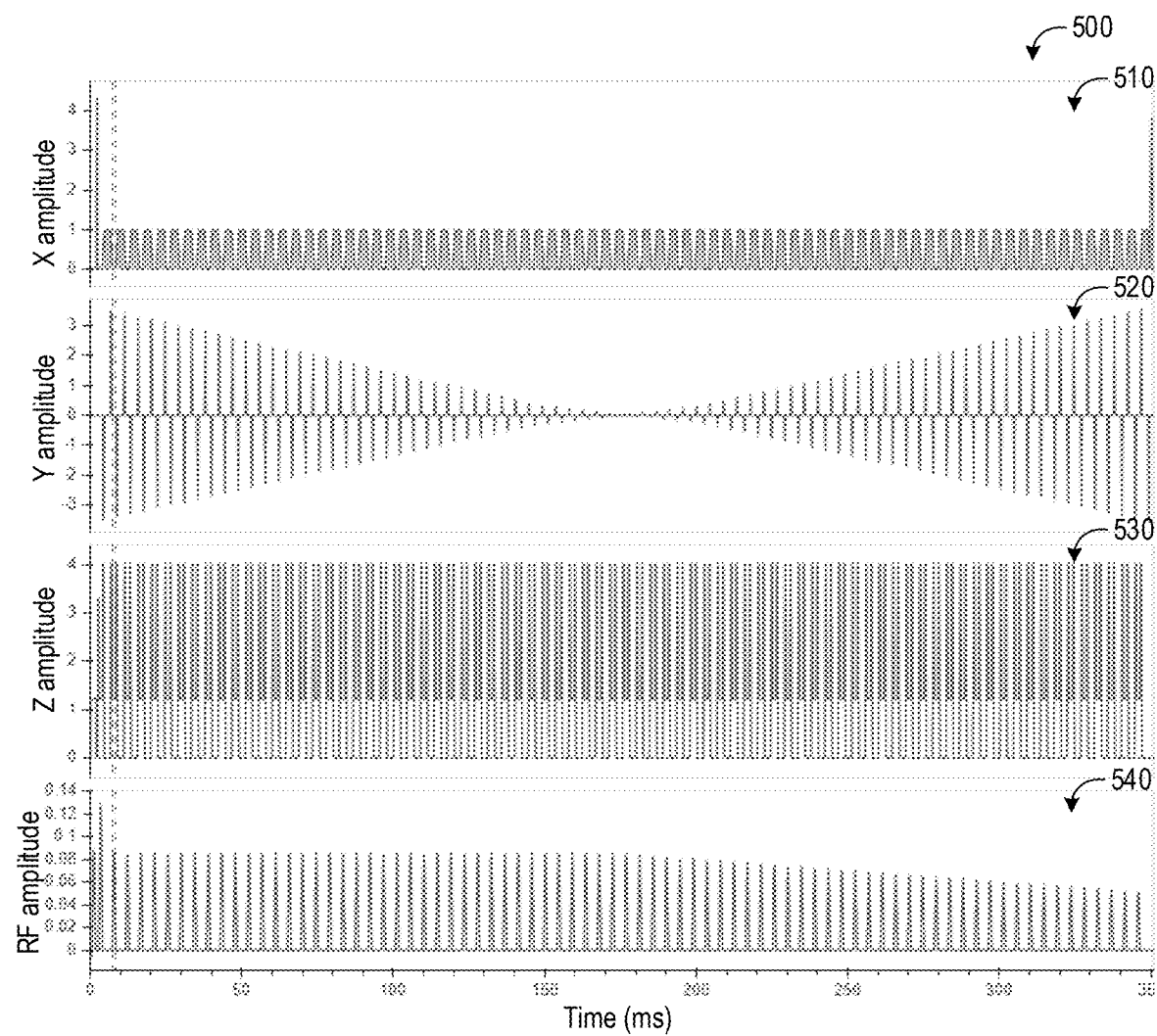
FIG. 5 shows an example imaging sequence that may be carried out as part of the first example slice-ahead inversion sequence.
Figure 6:
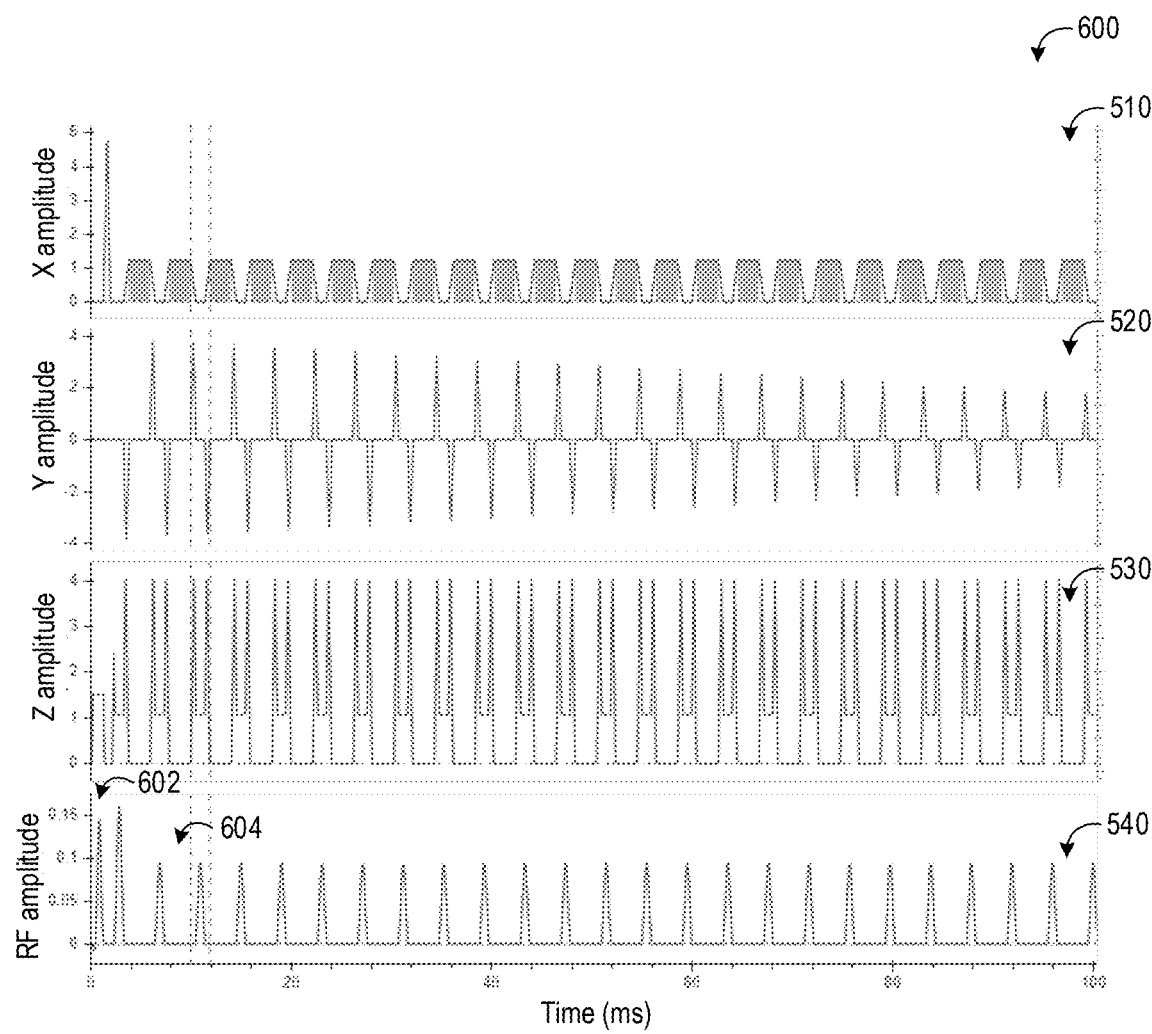
FIG. 6 shows a zoomed-in view of a portion of the example imaging sequence of FIG. 5.

FIGS. 5 and 6 show an example pulse sequence diagram 500 for an imaging sequence of the slice-ahead inversion sequences disclosed herein. For example, any of the imaging sequences of FIGS. 2 and 3 may be carried out according to the example pulse sequence diagram 500. FIG. 6 shows a magnified version 600 of the first 100 ms of the pulse sequence diagram 500. Pulse sequence diagram 500 includes a first plot 510 showing the amplitude of the readout/frequency encoding gradient (e.g., along the read-out axis, X) over time, a second plot 520 showing the amplitude of the phase encoding gradient (e.g., along the phase-encode axis, Y) over time, a third plot 530 showing the amplitude of the slice selection gradient (e.g., along the slice-select axis, Z) over time, and a fourth plot 540 showing RF amplitude as transmitted by RF transmitter coil(s) (e.g., the RF body coil unit 15) over time. In some examples, the gradient coil unit 13 of FIG. 1 may be controlled to generate the gradients shown in FIGS. 5 and 6.

The imaging sequence illustrated by pulse sequence diagram 500 may be a fast spin echo (FSE) sequence and thus includes an initial excitation pulse 602 (e.g., a 90° RF pulse) followed by a plurality of refocusing pulses 604 (e.g., RF pulses with relatively low flip angle), which is visualized in plot 540 of FIG. 6. During each RF pulse, a slice-selection gradient is applied to select the slice, as shown in plot 530. For example, for the first imaging sequence 204a, the slice-selection gradient would be applied to select slice 1, and each time the slice-selection gradient is applied during the imaging sequence, the same slice is selected. As shown by plot 520, the phase encoding gradient may be pulsed following each RF pulse, with the amplitude of the phase encoding pulses decreasing and then increasing over the course of the imaging sequence. Further, the read-out gradient is applied following each refocusing RF pulse, as shown by plot 510. While not shown in FIGS. 5 and 6, signal acquisition (e.g., via the local RF coil unit 14) occurs during each pulse of the read-out gradient. The FSE sequence shown in FIGS. 5 and 6 is a single-shot sequence wherein all the k-space data for reconstructing an image of that slice is obtained during the imaging sequence (e.g., without performing any additional excitation RF pulses). However, other imaging sequences are possible without departing from the scope of this disclosure, such as diffusion weighted imaging (DWI) sequences.

Figure 7:
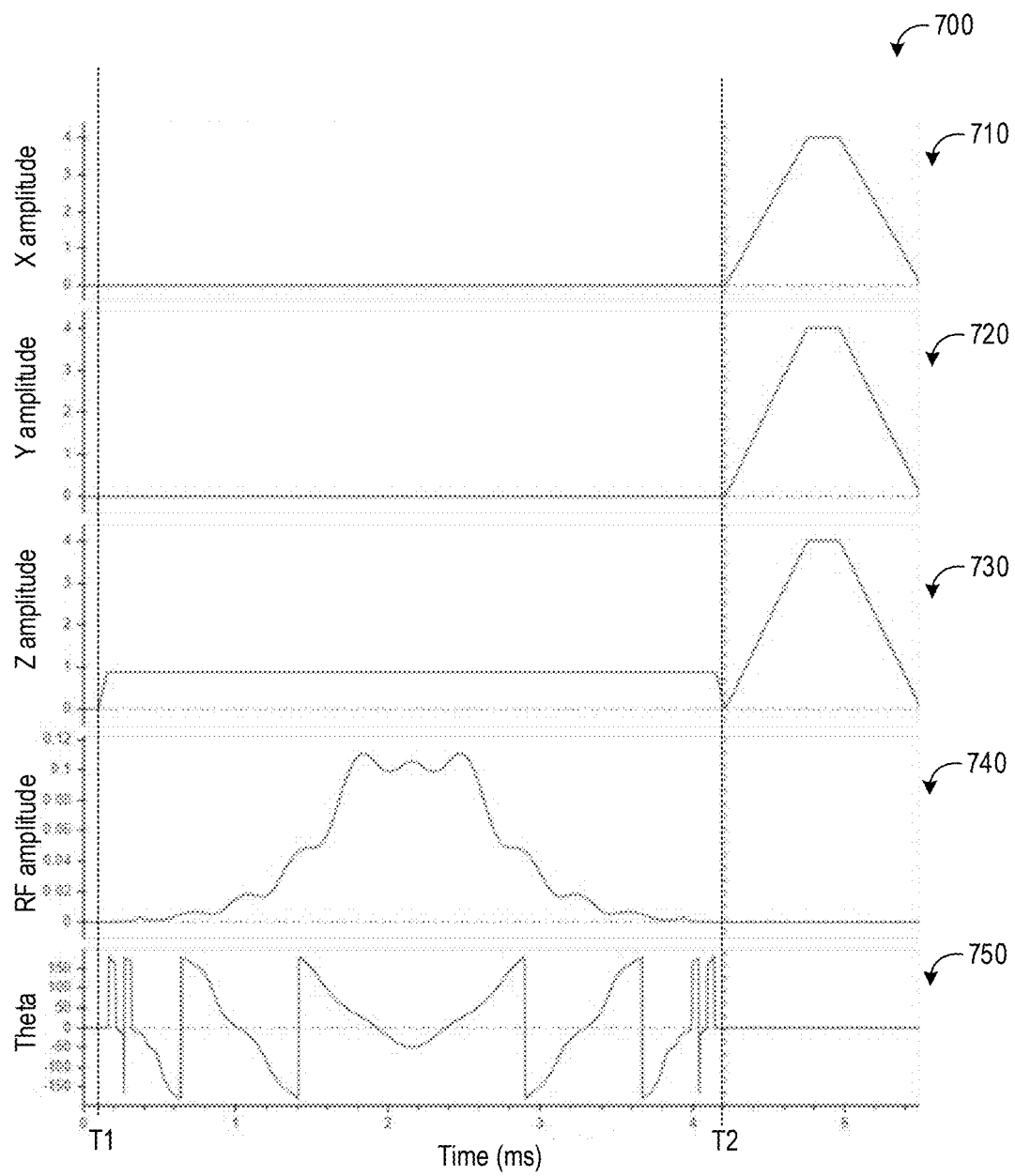
FIG. 7 shows an example saturation band sequence that may be carried out as part of the first example slice-ahead inversion sequence.

FIG. 7 shows an example pulse sequence diagram 700 for a saturation band sequence of the slice-ahead inversion sequences disclosed herein. For example, any of the saturation band sequences of FIG. 2 may be carried out according to the example pulse sequence diagram 700. Pulse sequence diagram 700 includes a first plot 710 showing the amplitude of the readout/frequency encoding gradient (e.g., along the read-out axis, X) over time, a second plot 720 showing the amplitude of the phase encoding gradient (e.g., along the phase-encode axis, Y) over time, a third plot 730 showing the amplitude of the slice selection gradient (e.g., along the slice-select axis, Z) over time, a fourth plot 740 showing RF amplitude as transmitted by RF transmitter coil(s) (e.g., the RF body coil unit 15) over time, and a fifth plot 750 showing phase modulation (e.g., of the RF pulse, labeled Theta) over time. In some examples, the gradient coil unit 13 may be controlled to generate the gradients shown in FIG. 7.

The pulse diagram 700 shows that the saturation band sequence includes application of a slice-selection gradient to select the appropriate slice, shown in plot 730, which is applied from time T1 to time T2. No other gradient pulses are applied during the time from T1 to T2. Between T1 and T2, an RF pulse is applied with phase modulation, which results in a complex saturation pulse for increased saturation efficiency. However, other saturation pulses could be applied without departing from the scope of this disclosure, such as a spatially-selective 900 pulse transmitted at a different carrier frequency than the RF pulses applied for imaging. Each of the X, Y, and Z gradients (e.g., the frequency, phase, and slice-select gradients) perform a spoiler after time T2 with a relatively large amplitude. In this way, the saturation band sequence generates a saturation band at a selected slice within the scan volume.

Figure 8:
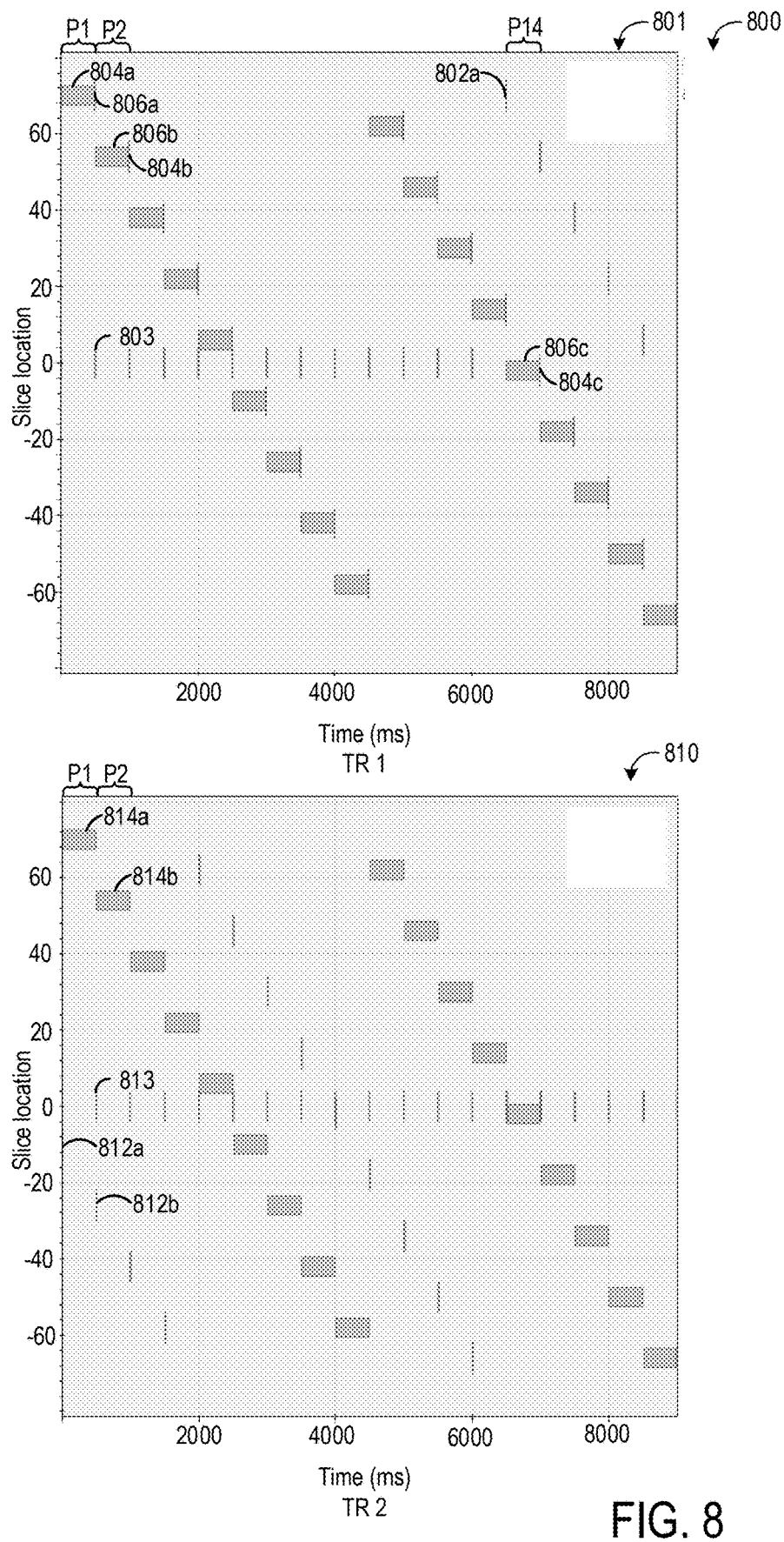
FIG. 8 shows example slice plots for a first repetition and a second repetition of a second example slice-ahead inversion sequence.

FIG. 8 includes a set of slice plots 800 illustrating a second example slice-ahead inversion sequence that may be performed by an MRI system (e.g., the MRI apparatus 10 of FIG. 1) to jointly acquire a non-inversion contrast (e.g., T2 contrast) and inversion contrast of a scan volume comprising N slices. In the example shown in FIG. 2, the inversion contrast is T2 FLAIR. The set of slice plots 800 includes a first slice plot 801 showing playouts of a first repetition (TR1) and a second slice plot 810 showing playouts of a second repetition (TR2). For each of the slice plots shown in FIG. 8, time is depicted along the horizontal axis (e.g., x-axis) and relative slice location is depicted along the vertical axis (e.g., y-axis). The relative slice location may be relative to a center location represented by 0 (e.g., the isocenter of the bore of the MRI apparatus), with slice locations extending in two directions (positive and negative) from the center.

TR1 and TR2 of the second example slice-ahead inversion sequence each includes 18 playouts, including a first playout (P1), a second playout (P2), and on up to the 18$^{th}$ playout. In the example shown in FIG. 8, 18 slices are imaged in each of TR1 and TR2 (e.g., the same 18 slices are imaged in each TR), which may include a subset of all the slices of the volume imaged according to the second example slice-ahead inversion sequence. Further slices of the volume are imaged in later TRs. In the example shown, the second example slice-ahead inversion sequence may be carried out so that the odd-numbered slices are imaged first (e.g., during TR1 and TR2) followed by the even-numbered slices (e.g., in TR3 and TR4), with a slice acquisition order of 1, 5, 9, 13, 17, 21, 25, 29, 33, 3, 7, 11, 15, 19, 23, 27, 31, and 35 for TR1 and TR2 and 2, 6, 10, 14, 18, 22, 26, 30, 34, 4, 8, 12, 16, 20, 24, 28, 32, and 36 for TR3 and TR4. However, the acquisition order shown is exemplary and may include more or fewer slices imaged per TR.

Each playout of TR1 includes an imaging sequence and a saturation band sequence, performed in that order, with inversion sequences being activated part-way through TR1 (e.g., starting at the 14$^{th}$ playout). Each inversion sequence, imaging sequence, and saturation band sequence may be slice-selective, with each inversion pulse acting on a different slice than is imaged during that playout. For example, for the first playout (P1) of TR1, a first imaging sequence 804a is performed and a first saturation band sequence 806a is performed. During the first imaging sequence 804a, the MRI system (e.g., the MRI apparatus 10) acquires k-space data that is usable to reconstruct an image of the slice acted on by the first imaging sequence 804a. The first saturation band sequence 806a may act to terminate magnetization in the imaged slice, which may improve inversion homogeneity. Thus, the first imaging sequence 804a may act on (e.g., image) a first slice of the acquisition order (e.g., which is slice 1, centered around slice location 70) and the first saturation band sequence 806a may also act on (e.g., terminate the magnetization of) the first slice. The first saturation band sequence 806a is parallel to the imaged slice (e.g., the first slice) and may be centered around the imaged slice or centered around a different slice of the scan volume/offset from the imaged slice. During the first playout as well as a plurality of subsequent playouts of TR1, no inversion sequences are activated, which is shown by the deactivated inversion sequences centered at slice location 0, such as deactivated inversion sequence 803.

For the second playout (P2) of TR1, a second imaging sequence 804b and a second saturation band sequence 806b are performed. The second imaging sequence 804b and the second saturation band sequence 806b act on the second slice of the acquisition order (slice 5). The third playout of TR1 includes an imaging sequence and a saturation band sequence that act on the third slice of the acquisition order (e.g., slice 9); the fourth playout of TR1 includes an imaging sequence and a saturation band sequence that act on the fourth slice of the acquisition order (e.g., slice 13), and so forth.

Part way through TR1, the inversion sequences are activated and act on slices that will be imaged in TR2. The activation of the inversion sequences is illustrated by the marks indicating the deactivated inversion sequences ceasing and shifting to activated inversion sequences located at the slice being inverted. For example, during the $14^{th}$ playout (P14), a first inversion sequence 802*a*, a third imaging sequence 804*c*, and a third saturation band sequence 806*c* are performed. The first inversion sequence 802*a* may include an RF inversion pulse that prepares magnetization for a subsequent inversion recovery imaging sequence. As such, the first inversion sequence 802*a* may act on a later slice in the slice-acquisition order (e.g., the first slice in the acquisition order, slice 1) that is imaged during TR2. The third imaging sequence 804*c* and the third saturation band sequence 806*c* each act on the $14^{th}$ slice of the acquisition order (e.g., slice 19). Similarly, for the remaining playouts of TR1 (e.g., the $15^{th}$-$18^{th}$ playouts), slice-selective imaging sequences and saturation band sequences are performed (on the $15^{th}$-$18^{th}$ slices of the acquisition order) and slice-selective inversion sequences are performed for slices imaged in TR2 (for the second, third, fourth, and fifth slices of the acquisition order). In some examples, the imaging sequences of the second example slice-ahead inversion sequence may be FSE sequences performed according to the pulse diagram 500 of FIGS. 5 and 6; the saturation band sequences of the second example slice-ahead inversion sequence may be performed according to the pulse diagram 700 of FIG. 7; and the inversion sequences of the second example slice-ahead inversion sequence may be performed according to the pulse diagram 400 of FIG. 4.

Because each inversion sequence performed during TR1 acts on a slice that is imaged in TR2, each of the slices that are imaged in TR1 are imaged without an earlier inversion sequence acting on those slices. Thus, the slices imaged in TR1 are imaged as the slices are exhibiting a non-inverted contrast (e.g., T2 contrast). Thus, TR1 may be a non-inversion repetition where k-space data is acquired of a non-inversion contrast. Once the inversion sequences are activated, inversion contrast is prepared for subsequent imaging in TR2.

It is to be appreciated that following conclusion the first imaging sequence 804*a*, the first saturation band sequence 806*a* is performed immediately and without delay. The second imaging sequence 804*b* may be performed after a delay corresponding to the length of an inversion sequence (which is the duration of the deactivated inversion sequence 803). Once the inversion sequences are activated, an inversion sequence is performed, followed immediately after by an imaging sequence (without any delay), then followed immediately after by a saturation band sequence, and then a new inversion sequence. In this way, imaging sequences are performed for nearly the entirety of TR1, other than when the inversion sequences and saturation band sequences are being performed and when the delays for the deactivated inversion sequences occur. Similar timing may apply during TR2 so that imaging sequences are performed for nearly the entirety of TR2, other than when the inversion sequences are being performed and when the delays for the deactivated saturation band sequences and/or inversion sequences occur (explained below).

TR2 includes a plurality of slice-selective imaging and inversion sequences performed across a plurality of playouts (e.g., 18) with each playout including an inversion sequence (wherein magnetization for a subsequence inversion recovery imaging sequence is prepped) and an imaging sequence (wherein k-space data for reconstructing an image is acquired), with the imaging sequence and the inversion sequence acting on different slices. No saturation band sequences are performed in the TR2 (e.g., the saturation band sequences are deactivated, which is shown somewhat by deactivated saturation band sequences, such as deactivated saturation band sequence 813, centered at slice location 0). For example, the first playout (P1) of TR2 includes a first inversion sequence 812*a* and a first imaging sequence 814*a*, with the first imaging sequence 814*a* acting on the first slice of the acquisition order (slice 1) and the first inversion sequence 812*a* acting on a different, later slice (e.g., the sixth slice of the acquisition order). Because the first slice of the acquisition order was acted on by the first inversion sequence 802*a* of TR1, the first imaging sequence 814*a* obtains k-space data of the first slice while the first slice is exhibiting the inversion contrast. As such, the first slice is imaged with both non-inversion contrast (e.g., T2 contrast, during TR1) and inversion contrast (e.g., T2FLAIR contrast, during TR2). The remaining playouts of the first half of the playouts of TR2 are similar to the first playout (e.g., in that they each include an inversion sequence and an imaging sequence) and act on the same slices as in TR1. However, starting at the $10^{th}$ playout (P10), the inversion sequences are deactivated (shown somewhat schematically by the additional marks centered at slice location 0), and thus playouts 10-18 of TR2 include only imaging sequences.

Thus, for the slices imaged during TR1 and TR2, the slices are first imaged with T2 contrast and then imaged with T2FLAIR contrast. The inversion time (TI) may be a second inversion time that is approximately 2500 ms (e.g., wherein TI is the time between an inversion sequence and when the slice the inversion sequence acts on is imaged), which is longer than the TI of the first example slice-ahead inversion sequence. For TR1, a first subset of the playouts may each include a slice-selective imaging sequence and saturation band sequence (with no inversion sequences) and a second subset of the playouts may each include a slice-selective imaging sequence and saturation band sequence (that act on the same slice) and a slice-selective inversion sequence that acts on a different slice. For TR2, a first subset of the playouts may each include a slice-selective inversion sequence and a slice-selective imaging sequence that act on different slices (and no saturation band sequence) and a second subset of the playouts may each include a slice-selective imaging sequence (and no saturation band sequence or inversion sequence). Thus, TR2 may be an inversion repetition where k-space data is acquired of an inversion contrast.

As appreciated from FIG. 8, each imaging sequence of TR1 and TR2 may act only on the specified slice. For example, the first imaging sequence 804*a* of TR1 only acts on slice 1 and the second imaging sequence 804*b* of TR1 only acts on slice 5. However, each inversion sequence may have a slice thickness that is greater than a thickness of each slice/greater than the slice thickness of each imaging sequence, such that each inversion sequence acts on a selected slice but also portions of adjacent slices. For example, each inversion pulse may have a slice thickness that is twice as thick as the slice thickness of the imaging sequences and may be centered around the selected slice.

TR3 and TR4 may be performed to image each remaining slice in the order specified by the acquisition order. TR3 may be performed similar to TR1, but with the even-numbered slices imaged with T2 contrast and magnetization prepared for inversion recovery imaging during TR4. TR4 may be performed similar to TR2, but acting on the even-numbered slices. It is to be appreciated that each repetition of the slice-ahead inversion sequence shown in FIG. 8 has the same duration, such that a repetition time of the non-inversion repetitions (TR1, TR3) and inversion repetitions (e.g., TR2, TR4) is constant.

Figure 9:
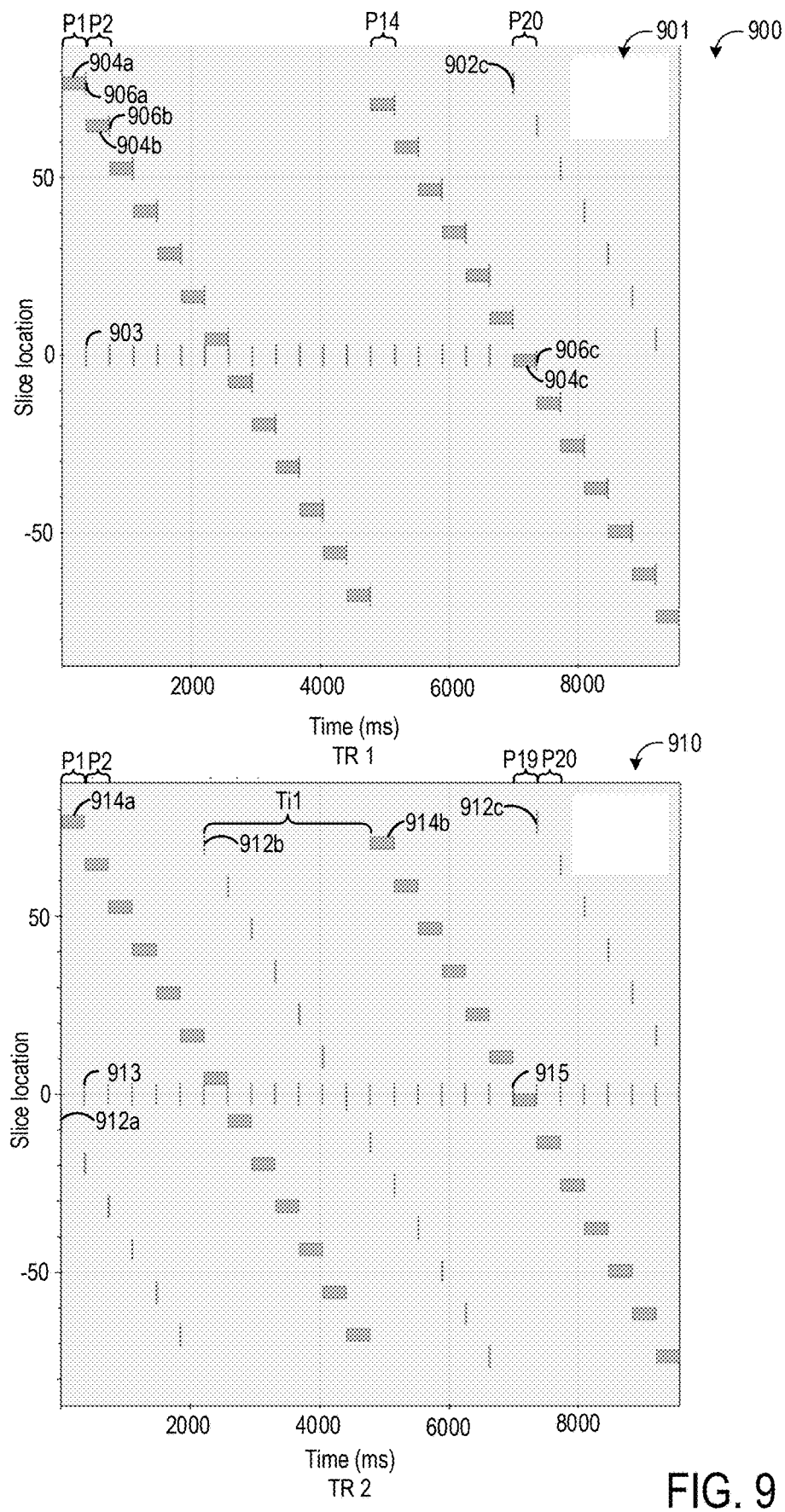
FIGS. 9 and 10 show example slice plots for a first repetition, a second repetition, a third repetition, and a fifth repetition of a third example slice-ahead inversion sequence.
Figure 10:
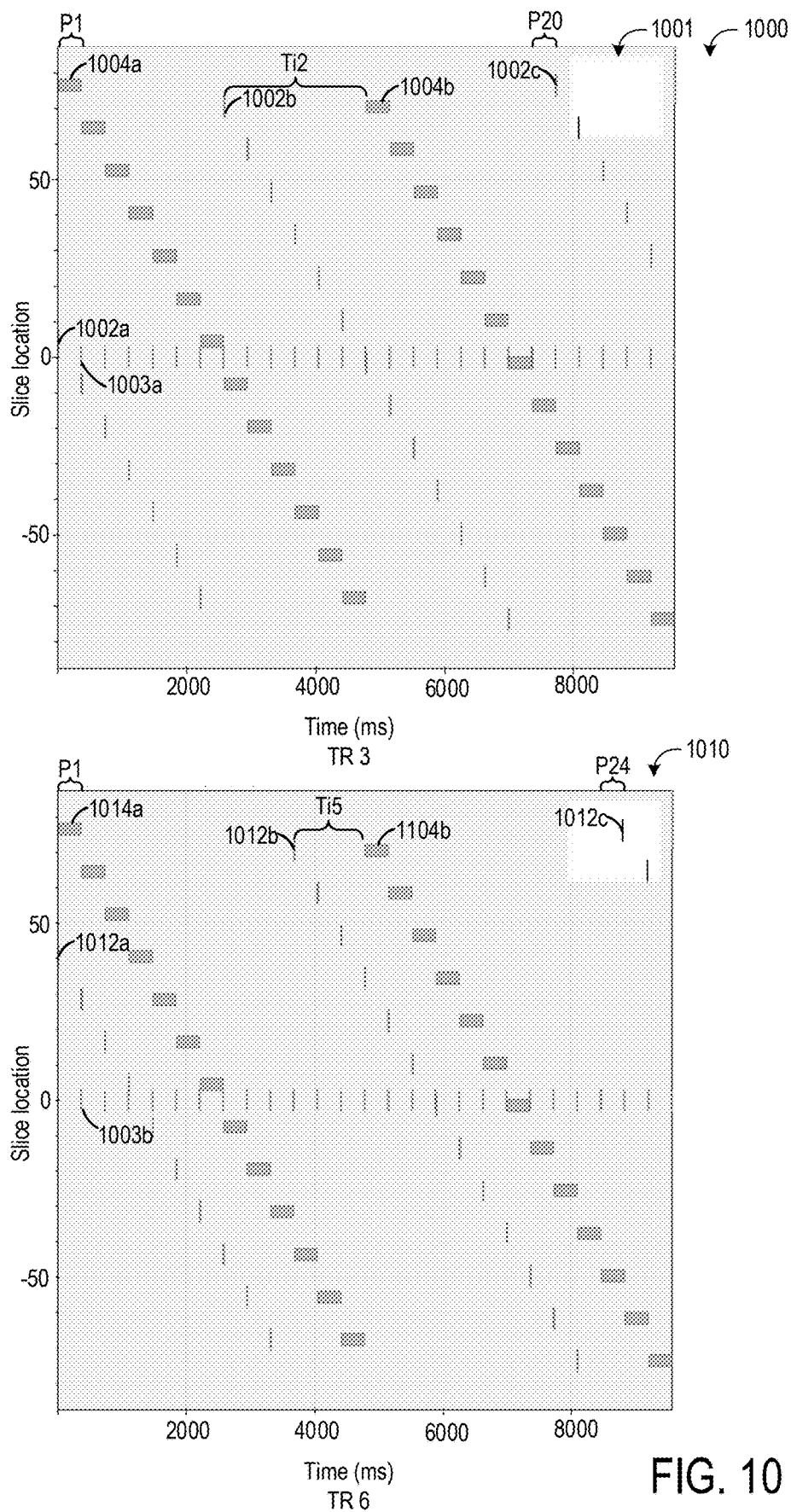
Figure 11:
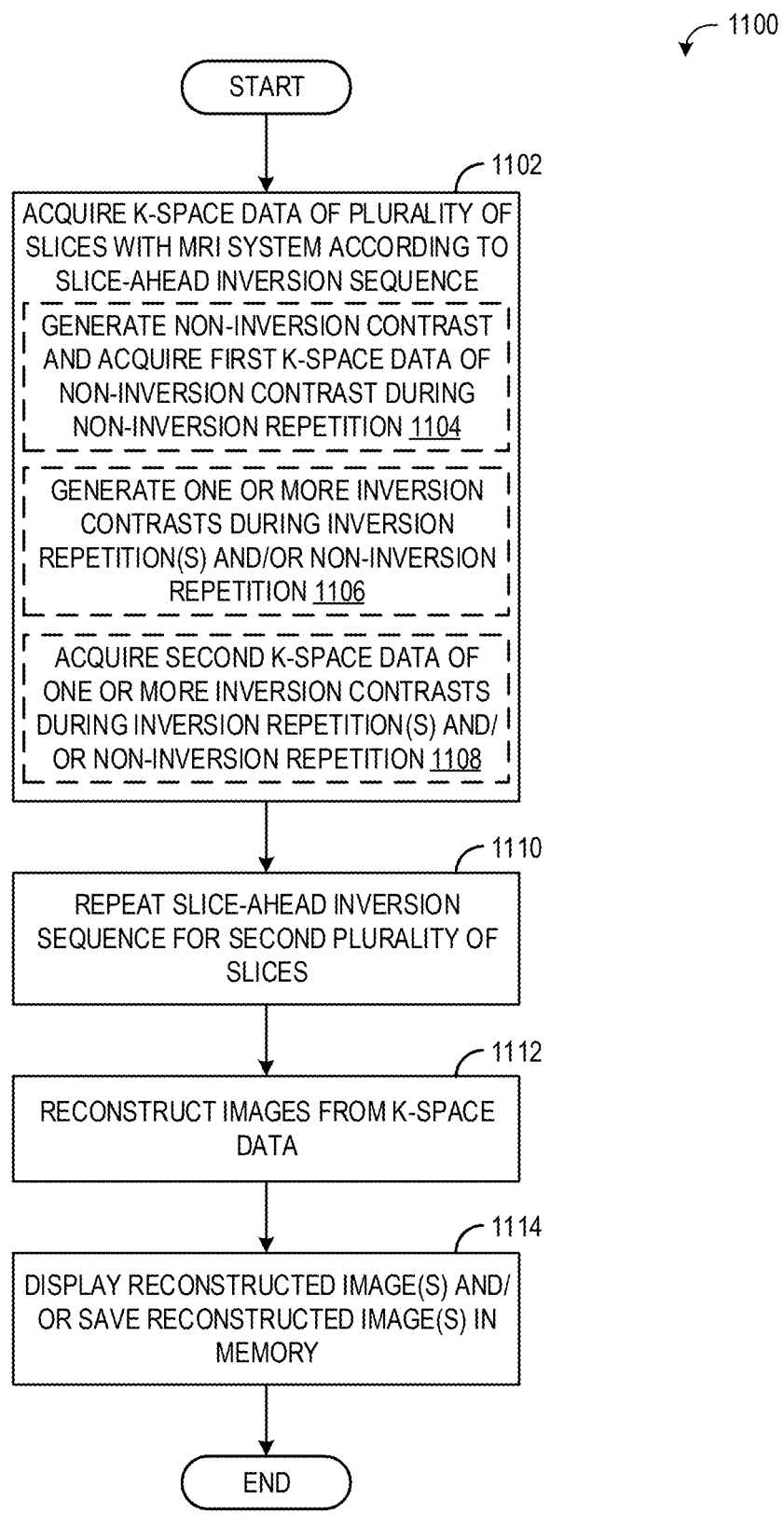
FIG. 11 is flow chart illustrating an example high-level method for performing an MRI scan according to a slice-ahead inversion sequence.

FIGS. 9 and 10 show example slice plots for a third example slice-ahead inversion sequence that may be performed by an MRI system (e.g., the MRI apparatus 10 of FIG. 1) to jointly acquire a non-inversion contrast (e.g., T2 contrast) and multiple inversion contrasts for a scan volume comprising N slices. The third slice-ahead inversion sequence may be similar to the second slice-ahead inversion sequence, but may include more imaged slices and may include additional TRs wherein the TI is varied to prepare and acquire different inversion contrasts. Thus, FIG. 9 includes a first set of slice plots 900 that includes a first slice plot 901 showing playouts of a first repetition (TR1) and a second slice plot 910 showing playouts of a second repetition (TR2). For each of the slice plots shown in FIG. 9 and FIG. 10, time is depicted along the horizontal axis (e.g., x-axis) and relative slice location is depicted along the vertical axis (e.g., y-axis). The relative slice location may be relative to a center location represented by 0 (e.g., the isocenter of the bore of the MRI apparatus), with slice locations extending in two directions (positive and negative) from the center.

TR1 and TR2 of the third example slice-ahead inversion sequence each includes 26 playouts, including a first playout (P1), a second playout (P2), and on up to the $26^{th}$ playout. In the example shown in FIG. 9, 26 slices are imaged in each of TR1 and TR2 (e.g., the same 26 slices are imaged in each TR), which may include a subset of all the slices of the volume imaged according to the third example slice-ahead inversion sequence. Further slices of the volume are imaged in later TRs. In the example shown, the third example slice-ahead inversion sequence may be carried out so that the odd-numbered slices are imaged first (e.g., during TR1 and TR2 and subsequent TRs) followed by the even-numbered slices (e.g., the TRs after the odd-numbered slices are imaged), with a slice acquisition order of 1, 5, 9, 13, 17, 21, 25, 29, 33, etc., to 49, 3, 7, 11, 15, 19, 23, 27, 31, 35, etc., up to 51 for the odd-numbered slices and 2, 6, 10, 14, 18, 22, 26, 30, 34, etc., up to 50, 4, 8, 12, 16, 20, 24, 28, 32, 36, etc., up to 52 for the even-numbered slices. However, it is to be appreciated that the acquisition order is exemplary and that more or fewer total slices may be imaged with more or fewer slices imaged per TR.

Similar to the second example slice-ahead inversion sequence, each playout of TR1 of the third example slice-ahead inversion sequence includes an imaging sequence and a saturation band sequence, performed in that order, with inversion sequences being initially deactivated and then activated part-way through TR1 (e.g., starting at the $20^{th}$ playout). Each inversion sequence, imaging sequence, and saturation band sequence may be slice-selective, with each inversion sequence acting on a different slice than is imaged during that playout. For example, for the first playout (P1) of TR1, a first imaging sequence 904a is performed and a first saturation band sequence 906a is performed. During the first imaging sequence 904a, the MRI system (e.g., the MRI apparatus 10) acquires k-space data that is usable to reconstruct an image of the slice acted on by the first imaging sequence 904a. The first saturation band sequence 906a may act to terminate magnetization in the imaged slice, which may improve inversion homogeneity. Thus, the first imaging sequence 904a may act on (e.g., image) a first slice of the acquisition order (e.g., which is slice 1, centered around slice location 74) and the first saturation band sequence 906a may also act on (e.g., terminate the magnetization of) the first slice. The first saturation band sequence 906a is parallel to the imaged slice (e.g., the first slice) and may be centered around the imaged slice or another slice of the scan volume. During the first playout as well as a plurality of subsequent playouts of TR1, no inversion sequences are activated, which is shown by the deactivated inversion sequences centered at slice location 0, such as deactivated inversion sequence 903.

For the second playout (P2) of TR1, a second imaging sequence 904b and a second saturation band sequence 906b are performed. The second imaging sequence 904b and the second saturation band sequence 906b act on the second slice of the acquisition order (slice 5). The third playout of TR1 includes an imaging sequence and a saturation sequence that act on the third slice of the acquisition order (e.g., slice 9); the fourth playout of TR1 includes an imaging sequence and a saturation sequence that act on the fourth slice of the acquisition order (e.g., slice 13), and so forth.

Part way through TR1, the inversion sequences are activated and act on slices that will be imaged in TR2. The activation of the inversion sequences is illustrated by the marks indicating the deactivated inversion sequences ceasing and shifting to activated inversion sequences located at the slice being inverted. For example, during the $20^{th}$ playout (P20), a first inversion sequence 902a, a third imaging sequence 904c, and a third saturation band sequence 906c are performed. The first inversion sequence 902a may include an RF inversion pulse that prepares magnetization for a subsequent inversion recovery imaging sequence. As such, the first inversion sequence 902a may act on a later slice in the slice-acquisition order (e.g., the first slice in the acquisition order, slice 1) that is imaged during TR2. The third imaging sequence 904c and the third saturation band sequence 906c each act on the $20^{th}$ slice of the acquisition order (e.g., slice 27). Similarly, for the remaining playouts of TR1 (e.g., the $21^{st}$-$26^{th}$ playouts), slice-selective imaging sequences and saturation band sequences are performed (on the $21^{st}$-$26^{th}$ slices of the acquisition order) and slice-selective inversion sequences are performed for slices imaged in TR2 (for the second through seventh slices of the acquisition order). In some examples, the imaging sequences of the second example slice-ahead inversion sequence may be FSE sequences performed according to the pulse diagram 500 of FIGS. 5 and 6; the saturation band sequences of the second example slice-ahead inversion sequence may be performed according to the pulse diagram 700 of FIG. 7; and the inversion sequences of the second example slice-ahead inversion sequence may be performed according to the pulse diagram 400 of FIG. 4.

Because each inversion sequence performed during TR1 acts on a slice that is imaged in TR2, each of the slices that are imaged in TR1 are imaged without an earlier inversion sequence acting on those slices. Thus, the slices imaged in TR1 are imaged as the slices are exhibiting a non-inverted contrast (e.g., T2 contrast) and TR1 may be a non-inversion repetition where k-space data is acquired of a non-inversion contrast. Once the inversion sequences are activated, inversion contrast is prepared for subsequent imaging in TR2.

It is to be appreciated that following conclusion the first imaging sequence 904a, the first saturation band sequence 906a is performed immediately and without delay. The second imaging sequence 904b may be performed after a delay corresponding to the length of an inversion sequence (which is the duration of the deactivated inversion sequence 903). Once the inversion sequences are activated, an inversion sequence is performed, followed immediately after by an imaging sequence (without any delay), then followed immediately after by a saturation band sequence, and then a new inversion sequence. In this way, imaging sequences are performed for nearly the entirety of TR1, other than when the inversion sequences and saturation band sequences are being performed and when the delays for the deactivated inversion sequences occur. Similar timing may apply during TR2 and any subsequent TRs so that imaging sequences are performed for nearly the entirety of each TR, other than when the inversion sequences are being performed and when the delays for the deactivated saturation band sequences and/or inversion sequences occur (explained below).

TR2 includes a plurality of slice-selective imaging and inversion sequences performed across a plurality of playouts (e.g., 26) with each playout (except one playout wherein the inversion sequence is deactivated, explained below) including an inversion sequence (wherein magnetization for a subsequence inversion recovery imaging sequence is prepped) and an imaging sequence (wherein k-space data for reconstructing an image is acquired), with the imaging sequence and the inversion sequence acting on different slices. No saturation band sequences are performed in TR2 (e.g., the saturation band sequences are deactivated, which is shown by the deactivated saturation band sequences, such as deactivated saturation band sequence 913, centered at slice location 0). For example, the first playout (P1) of TR2 includes a first inversion sequence 912a and a first imaging sequence 914a, with the first imaging sequence 914a acting on the first slice of the acquisition order (slice 1) and the first inversion sequence 912a acting on a different, later slice (e.g., the eighth slice of the acquisition order). Because the first slice of the acquisition order was acted on by the first inversion sequence 902a of TR1, the first imaging sequence 914a obtains k-space data of the first slice while the first slice is exhibiting the inversion contrast. As such, the first slice is imaged with both non-inversion contrast (e.g., T2 contrast, during TR1) and a first inversion contrast (Ti1 during TR2). The TI for the first inversion contrast of the third example slice ahead inversion sequence is shown in slice plot 910, exemplarily between a second inversion sequence 912b that acts on slice 3 and a second imaging sequence 914b that acts on slice 3. The T1 is the time between the inversion sequence and the imaging sequence. The first inversion contrast is generated with a first inversion time (Ti1), such as approximately 2500 ms (e.g., T2FLAIR).

The remaining playouts of the first half of the playouts of TR2 are similar to the first playout (e.g., in that they each include an inversion sequence and an imaging sequence) and act on the same slices as in TR1. However, an inversion sequence is deactivated during the 19$^{th}$ playout (P19), shown by mark 915 being of increased thickness relative to the marks that denote deactivated saturation band sequences. The deactivated inversion sequence is still played out to maintain the timing in order, but with the RF of the inversion pulse off so as not to invert any slices. Accordingly, the 19$^{th}$ playout of TR2 includes only an imaging sequence. Then, starting at the 20$^{th}$ playout (P20), the inversion sequences are reactivated, with a third inversion sequence 912c shown that acts on the first slice of the acquisition order (e.g., slice 1). Playouts 21-26 each include an inversion pulse that acts on slices 2-6 of the acquisition order, respectively. Thus, by skipping one inversion pulse, the TI is shifted in order to generate a second inversion contrast for slices imaged in TR3. TR2 may be an inversion repetition where k-space data is acquired of an inversion contrast.

FIG. 10 shows a second set of slice plots 1000 for the third example slice-ahead inversion sequence. The second set of slice plots 1000 includes a third slice plot 1001 showing playouts of a third repetition (TR3) and a fourth slice plot 1010 showing playouts of a sixth repetition (TR6) of the third example slice-ahead inversion sequence. Similar to TR2, TR3 includes a plurality of slice-selective imaging and inversion sequences performed across a plurality of playouts (e.g., 26) with each playout (except one playout wherein the inversion sequence is skipped, explained below) including an inversion sequence (wherein magnetization for a subsequence inversion recovery imaging sequence is prepped) and an imaging sequence (wherein k-space data for reconstructing an image is acquired), with the imaging sequence and the inversion sequence acting on different slices. No saturation band sequences are performed in TR3 (e.g., the saturation band sequences are deactivated, which is shown by the deactivated saturation band sequences, such as deactivated saturation band sequence 1003a, centered at slice location 0). For example, the first playout (P1) of TR3 includes a first inversion sequence 1002a and a first imaging sequence 1004a (and a deactivated saturation band sequence 1003a), with the first imaging sequence 1004a acting on the first slice of the acquisition order (slice 1) and the first inversion sequence 1002a acting on a different, later slice (e.g., the seventh slice of the acquisition order). Because the first slice of the acquisition order was acted on by the first inversion sequence 912a of TR2, the first imaging sequence 1004a obtains k-space data of the first slice while the first slice is exhibiting the inversion contrast. As such, the first slice is imaged with non-inversion contrast (e.g., T2 contrast, during TR1), a first inversion contrast (Ti1 during TR2), and a second inversion contrast (Ti2 during TR3). The TI for the second inversion contrast of the third example slice ahead inversion sequence is shown in slice plot 1001, exemplarily between a second inversion sequence 1002b that acts on slice 3 and a second imaging sequence 1004b that acts on slice 3. The T1 is the time between the inversion sequence and the imaging sequence. The second inversion contrast is generated with a second inversion time (Ti2), such as approximately 2200 ms.

A portion of the remaining playouts of TR3 are similar to the first playout (e.g., in that they each include an inversion sequence and an imaging sequence) and act on the same slices as in TR1 and TR2. However, an inversion sequence is deactivated during the 20$^{th}$ playout (P20). Accordingly, the 20$^{th}$ playout of TR3 includes only an imaging sequence. Then, starting at the 21 playout, the inversion sequences are reactivated, with a third inversion sequence 1002c shown that acts on the first slice of the acquisition order (e.g., slice 1). Playouts 22-26 each include an inversion pulse that acts on slices 2-5 of the acquisition order, respectively. Thus, by skipping one inversion pulse, the TI is shifted in order to generate a third inversion contrast for slices imaged in TR4. TR4 may be similar to T3, but with the inversion sequences separated from corresponding imaging sequences by a third, different TI (e.g., Ti3) in order to generate the third inversion contrast, and with the inversion sequence of the 21$^{st}$ playout skipped to shift the subsequent inversion sequences to generate a fourth inversion contrast. This process can be repeated for a desired number of TRs to generate a desired number of inversion contrasts, and more than one inversion sequence can be deactivated (e.g., in a row) during a TR to produce a desired inversion contrast.

For example, the fourth slice plot 1010 shows the imaging sequences and inversion sequences for the sixth repetition (TR6) of the third example slice-ahead inversion sequence. Similar to TR3, TR6 includes a plurality of slice-selective imaging and inversion sequences performed across a plurality of playouts (e.g., 26) with each playout (except one playout wherein the inversion sequence is skipped, explained below) including an inversion sequence and an imaging sequence, with the imaging sequence and the inversion sequence acting on different slices. Each inversion sequence preps magnetization for a subsequent inversion recovery imaging sequence and each imaging sequence acquires k-space data for reconstruction an image. No saturation band sequences are performed in TR6 (e.g., the saturation band sequences are deactivated, which is shown by the deactivated saturation band sequences, such as deactivated saturation band sequence 1003b, centered at slice location 0). For example, the first playout (P1) of TR6 includes a first inversion sequence 1012a and a first imaging sequence 1014a, with the first imaging sequence 1014a acting on the first slice of the acquisition order (slice 1) and the first inversion sequence 1012a acting on a different, later slice (e.g., the fourth slice of the acquisition order). Because the first slice of the acquisition order was acted on by an inversion sequence of TR5, the first imaging sequence 1014a obtains k-space data of the first slice while the first slice is exhibiting the inversion contrast. As such, the first slice is imaged with non-inversion contrast (e.g., T2 contrast, during TR1), a first inversion contrast (Ti1 during TR2), a second inversion contrast Ti2 during T3), a third inversion contrast during TR4, a fourth inversion contrast during TR5, and a fifth inversion contrast during TR6. The TI for the fifth inversion contrast of the third example slice ahead inversion sequence is shown in slice plot 1010, exemplarily between a second inversion sequence 1012b that acts on slice 3 and a second imaging sequence 1014b that acts on slice 3. The TI is the time between the inversion sequence and the imaging sequence. The fifth inversion contrast is generated with a fifth inversion time (Ti5) that is less than each of Ti1, Ti2, Ti3, and Ti4, such as approximately 1500 ms.

A portion of the remaining playouts of TR6 are similar to the first playout (e.g., in that they each include an inversion sequence and an imaging sequence). However, an inversion sequence is deactivated during the 24$^{th}$ playout (P24). Accordingly, the 24$^{th}$ playout of TR6 includes only an imaging sequence. Then, starting at the 25$^{th}$ playout, the inversion sequences are reactivated, with a third inversion sequence 1002c shown that acts on the first slice of the acquisition order (e.g., slice 1). Playout 26 includes an inversion pulse that acts on slice 2 of the acquisition order. Thus, by deactivating one inversion pulse, the TI is shifted in order to generate a sixth inversion contrast for slices imaged in TR7. It is to be appreciated that in the final TR of the sequence for the odd-numbered slices, only inversion sequences that precede an imaging sequence performed in the final TR are performed, as there are no slices left to prepare. The sequence may then repeat for the even-numbered slices (e.g., a next repetition similar to TR1 may be performed for the even-numbered slices, followed by further repetitions to prepare and acquire the various inversion contrasts). It is to be appreciated that each repetition of the slice-ahead inversion sequence shown in FIGS. 9 and 10 has the same duration, such that a repetition time of the non-inversion repetitions (e.g., TR1 and the first repetition for the even-numbered slices) and inversion repetitions (e.g., TR2, TR3, and the remaining inversion repetitions) is constant.

FIG. 11 is a flowchart illustrating a high-level method 1100 for an MRI scan, according to an embodiment of the disclosure. Method 1100 may be implemented with the MRI apparatus 10 of FIG. 1. Method 1100 may be carried out according to instructions stored in non-transitory memory and executed by one or more processors, such as according to instructions stored in memory of controller unit 25 and executed by one or more processors or the controller unit 25. Method 1100 may be carried out in response to initiation of an MRI scan protocol that includes a slice-ahead inversion sequence, and thus may be initiated after a patient has been positioned in a bore of the MRI apparatus.

At 1102, method 1100 includes acquiring k-space data of a plurality of slices of a scan volume with an MRI system according to a slice-ahead inversion sequence. Acquiring the k-space data of the plurality of slices according to the slice-ahead inversion sequence may include generating a non-inversion contrast (e.g., a contrast without inversion preparation), such as T2 contrast, and acquiring first k-space data of the non-inversion contrast during a non-inversion repetition (e.g., during a first repetition (TR1)), as indicated at 1104. For example, as explained above with respect to FIGS. 2, 8, and 9, the first repetition of the slice-ahead inversion sequence may include a plurality of playouts wherein an imaging sequence is performed in each playout, without an earlier inversion sequence being performed on the slices imaged via the imaging sequences. The non-inversion contrast may thus include a contrast wherein no longitudinal steady state of magnetization is reached. In some examples, such as the second and third example slice-ahead inversion sequences, each slice of the plurality of slices may be imaged during TR1 with each slice generating non-inversion contrast during imaging. In other examples, such as the first example slice-ahead inversion sequence, only a portion of the slices imaged during TR1 may be imaged while generating non-inversion contrast (e.g., the first four slices of the acquisition order). In some examples, during at least the non-inversion repetition, the imaging sequences that are performed may be followed by a slice-selective saturation band to terminate the magnetization and increase homogeneity of the subsequent inversion contrast.

Acquiring the k-space data of the plurality of slices may further include generating one or more inversion contrasts during the non-inversion repetition and/or one or more inversion repetitions (e.g., a second repetition (TR2), and/or one or more subsequent TRs following TR2), as indicated at 1106. The one or more inversion contrasts may be generated by performing slice-selective inversion sequences that are spaced apart from respective slice-selective imaging sequences by an inversion time (TI), wherein the TI can be varied across repetitions to generate more than one inversion contrast. For example, the first example slice-ahead inversion sequence may have a TI of approximately 1000 ms to generate T1FLAIR inversion contrast. The second slice-ahead inversion sequence may have a TI of approximately 2500 ms to generate T2FLAIR inversion contrast. The third example slice-ahead inversion sequence may have a first TI (Ti1) of 2500 ms, for example, and one or more additional TIs of less than Ti1. Second k-space data of the one or more inversion contrasts is acquired during the non-inversion repetition and/or one or more inversion repetitions, as indicated at 1108. For example, the first example slice-ahead inversion sequence generates inversion contrast for some of the slices that are subsequently imaged during the non-inversion repetition/TR1 (e.g., the last five slices that are imaged during TR1 are generating inversion contrast when imaged), with remaining slices of the plurality of slices imaged (while generating inversion contrast) during the inversion repetitions (e.g., TR2 and, in some examples, also during TR3, TR4, and TR5). The second example slice-ahead inversion sequence acquires second k-space data of the plurality of slices (while generating the inversion contrast) only in an inversion repetition (TR2). The third example slice-ahead inversion sequence acquires second k-space data of the plurality of slices while generating a first inversion contrast in a first inversion repetition (e.g., TR2), while generating a second inversion contrast in a second inversion repetition (e.g., TR3), while generating a third inversion contrast in a third inversion repetition (e.g., TR4), etc.

As explained above, to generate an inversion contrast in a given slice, an inversion sequence is performed that acts on the given slice. An imaging sequence is performed on the given slice after a delay that corresponds to the inversion time. However, each of the slice-ahead inversion sequences disclosed herein interleaves slice imaging and inversion preparation such that slice imaging and/or inversion preparation of other slices occurs during the inversion time of the given slice. For example, in the first slice-ahead inversion sequence of FIG. 2, the first inversion sequence is performed that acts on the fifth slice of the acquisition order. During the time between when the first inversion sequence is performed and when the imaging sequence is performed that acts on the fifth slice of the acquisition order, a respective imaging sequence is performed that acts on each of the first through fourth slices of the acquisition order (while those slices are generating T2 contrast), and respective inversion sequences are performed that act on later slices in the acquisition order (e.g., the sixth, seventh, eighth, and ninth slices of the acquisition order). As another example, for the second slice-ahead inversion sequence of FIG. 8, the first inversion sequence that is performed acts on the first slice of the acquisition order. During the time between when the first inversion sequence is performed and when the next imaging sequence is performed that acts on the first slice of the acquisition order (e.g., the first imaging sequence of TR2), a respective imaging sequence is performed that acts on each of the $14^{th}$ through $18^{th}$ slices of the acquisition order (while those slices are generating T2 contrast), and respective inversion sequences are performed that act on later slices in the acquisition order (e.g., the second through fifth slices of the acquisition order). In doing so, each of the inversion repetition(s) and non-inversion repetition(s) may have the same repetition time.

At 1110, method 1100 includes repeating the slice-ahead inversion sequence for a second plurality of slices. For example, only a portion of the scan volume to be imaged is imaged during the non-inversion repetition (e.g., TR1) and one or more inversion repetitions (e.g., TR2, and, when included, the subsequent TRs) described above. In the first example slice-ahead inversion sequence, one quarter of the total slices of the volume to be imaged are imaged in TR1 and TR2; the remaining slices are imaged across TR3, TR4, and TR5. In the second example slice-ahead inversion sequence, one half of the total slices of the volume to be imaged are imaged in TR1 and TR2; the remaining slices are imaged across TR3 and TR4. In the third example slice-ahead inversion sequence, one half of the total slices of the volume to be imaged are imaged in TR1, TR2, and the subsequent TRs; the remaining slices are imaged across a second set of TRs. Thus, the slice-ahead inversion sequence may be repeated at least once, on different slices, until the entire volume is imaged. The number of slices that are imaged while generating the non-inversion contrast may be flexible and vary based on the specific imaging sequence. For example, some inversion sequences, such as the first example slice-ahead inversion sequence, only image some of the slices of the volume while those slices are generating non-inversion contrast, while other inversion sequences, such as the second example slice-ahead inversion sequence, images all slices of the volume while generating non-inversion contrast.

At 1112, images are reconstructed from the k-space data. For example, non-inversion images (e.g., T2 images) may be reconstructed from the first k-space data and inversion images (e.g., T1FLAIR, T2FLAIR) may be reconstructed from the second k-space data. When more than inversion contrast is generated/imaged, an image may be reconstructed for each different inversion contrast. Thus, at least for some of the slices of the volume, a non-inversion contrast image may be reconstructed, and at least one inversion contrast image may be reconstructed for each slice of the volume. In this way, some slice-ahead inversion sequences may include reconstruction of two or more images for each slice of the volume, while other slice-ahead inversion sequences may include reconstruction of only one image for some slices of the volume and two images for other slices of the volume. At 1114, the reconstructed image(s) are displayed (e.g., on a display device such as display unit 33) and/or saved in memory. Method 1100 then ends.

Figure 12:
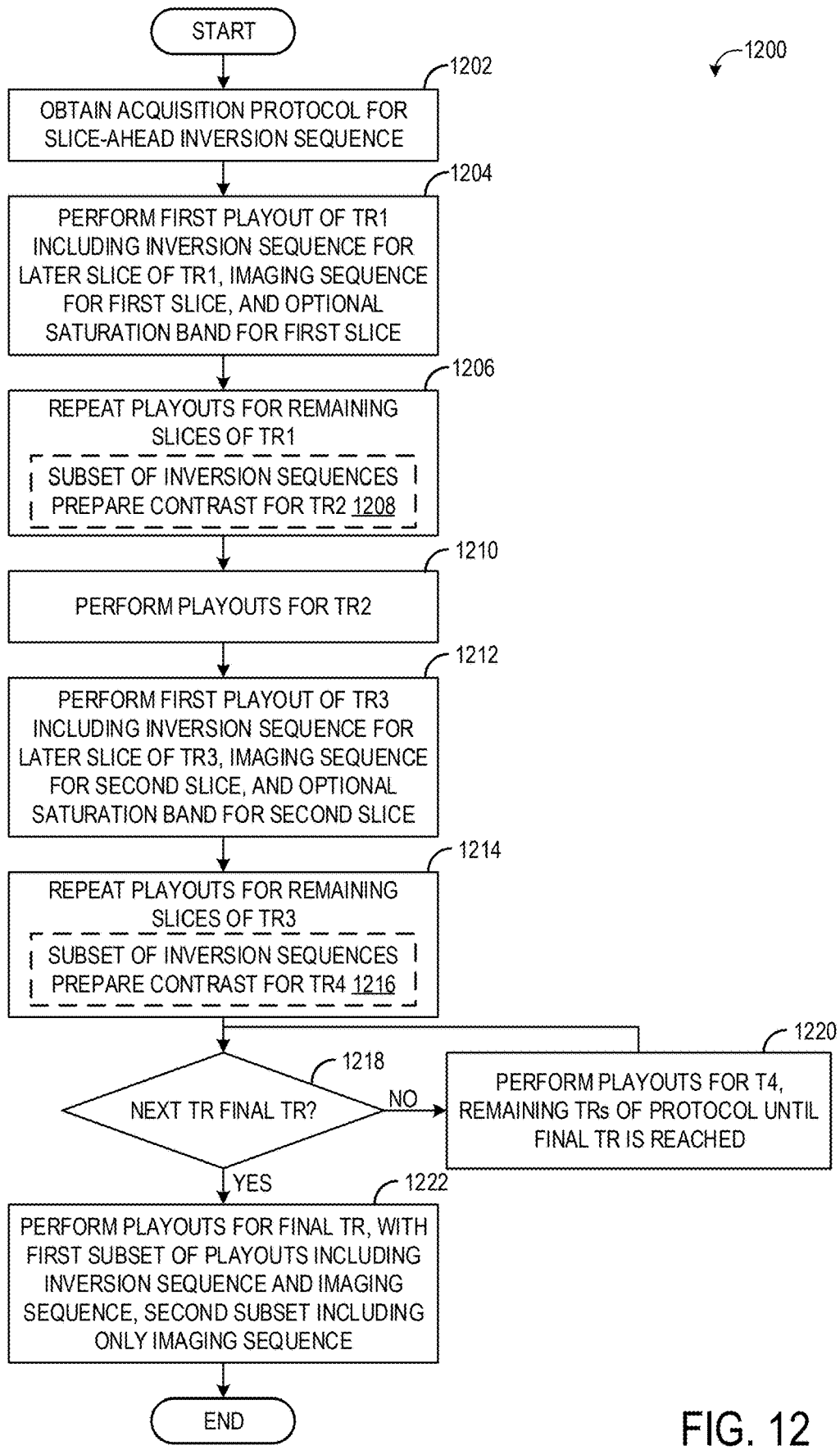
FIG. 12 is a flow chart illustrating an example method for performing the first example slice-ahead inversion sequence.

FIG. 12 illustrates a method 1200 for performing a first example slice-ahead inversion sequence. Method 1200 is a more detailed version of method 1100 and is specific to performing the first example slice-ahead inversion sequence, e.g., of FIGS. 2 and 3. Thus, method 1200 may be implemented with the MRI apparatus 10 of FIG. 1 and carried out according to instructions stored in non-transitory memory and executed by one or more processors, such as according to instructions stored in memory of controller unit 25 and executed by one or more processors or the controller unit 25. Method 1200 may be carried out in response to initiation of an MRI scan protocol that includes a slice-ahead inversion sequence, and thus may be initiated after a patient has been positioned in a bore of the MRI apparatus.

At 1202, an acquisition protocol for the slice-ahead inversion sequence that is to be performed is obtained. The acquisition protocol may include, among other parameters, the number of slices to be imaged, the slice acquisition order for imaging the slices, and which non-inversion and inversion contrast(s) are to be generated and imaged. At 1204, a first playout of TR1 is performed including an inversion sequence for a later slice of TR1, an imaging sequence for a first slice of the acquisition order, and an optional saturation band sequence for the first slice of the acquisition order. The inversion sequence may prepare inversion contrast for a different slice than the first slice of the acquisition order (e.g., the fifth slice of the acquisition order), with the timing of the inversion sequence and later imaging of that slice selected to generate an inversion time (TI), which in the first example slice-ahead inversion sequence may be T1FLAIR. The first slice of the acquisition order is imaged without a prior inversion sequence acting on the first slice, and thus based on the imaging sequence performed (which may be an FSE sequence as shown in FIGS. 5 and 6), a non-inversion contrast may be acquired when the first slice is imaged.

At 1206, the playouts are repeated for the remaining slices of TR1. The acquisition order may specify that only some of the total slices of the volume to be imaged in may be imaged in TR1, and each of those slices may be imaged via a respective playout that includes an imaging sequence and an optional saturation band sequence. Each remaining playout of TR1 may also include an inversion sequence that acts on a different slice than is imaged during that playout. Further, some of the slices imaged during TR1 (e.g., the fifth through ninth slices of the acquisition order) may be exhibiting inversion contrast while those slices are imaged. As indicated at 1208, a subset of the inversion sequences performed in TR1 prepare contrast that will be imaged in TR2.

At 1210, method 1200 includes performing the playouts for TR2. The playouts for TR2 may be identical to the playouts of TR1, with each playout including an inversion sequence and an imaging sequence and an optional saturation band sequence. Some of the inversion sequences act on slices imaged during TR2, while the other inversion sequences act on slices that will be imaged in TR3 (assuming that the acquisition protocol dictates that less than half the slices of the volume be imaged each TR). However, as each slice has been prepared with an earlier inversion sequence, each slice imaged in TR2 is imaged while exhibiting inversion contrast. Thus, for some of the slices (e.g., the fifth through ninth slices of the acquisition order) may be imaged twice while generating the same inversion contrast.

At 1212, method 1200 includes performing a first playout of TR3 that includes an inversion sequence for a later slice of TR3 (e.g., the fifth slice imaged in TR3, which may be the 14$^{th}$ slice of the acquisition order), an imaging sequence for a second slice, and an optional saturation band sequence for the second slice. It is to be appreciated that the second slice may located adjacent the first slice of the acquisition order and thus may be a second slice in location, but may be the 10$^{th}$ slice in the acquisition order. At 1214, the playout is repeated for the remaining slices of TR3, such that each playout includes an inversion sequence for a later slice, as well as an imaging sequence and an optional saturation band sequence. Some of the inversion sequences act on slices imaged during TR3, while the other inversion sequences act on slices that will be imaged in TR4. However, as each slice has been prepared with an earlier inversion sequence, each slice imaged in TR3 is imaged while exhibiting inversion contrast. As indicated at 1216, a subset of the inversion sequences performed in TR3 prepare contrast that will be imaged in TR4.

At 1218, method 1200 determines if the next TR that is to be performed is the final TR of the acquisition protocol. If the next TR is not the final TR, method 1200 proceeds to 1220 to perform the playouts for TR4 and any remaining TRs of the protocol until the final TR is reached. TR4 may performed similarly to TR3, but on a next set of slices of the volume. Method 1200 continues to 1218 to again determine if the next TR is the final TR. If the next TR is the final TR, method 1200 proceeds to 1222 to perform the playouts for the final TR, with a first subset of the playouts of the final TR including an inversion sequence and imaging sequence and a second subset of the playouts of the final TR including only an imaging sequence. Thus, during the final TR, inversion contrast for slices imaged in a next TR is not needed, nor are the saturation band sequences (when performed in the earlier TRs). Method 1200 then ends.

Figure 13:
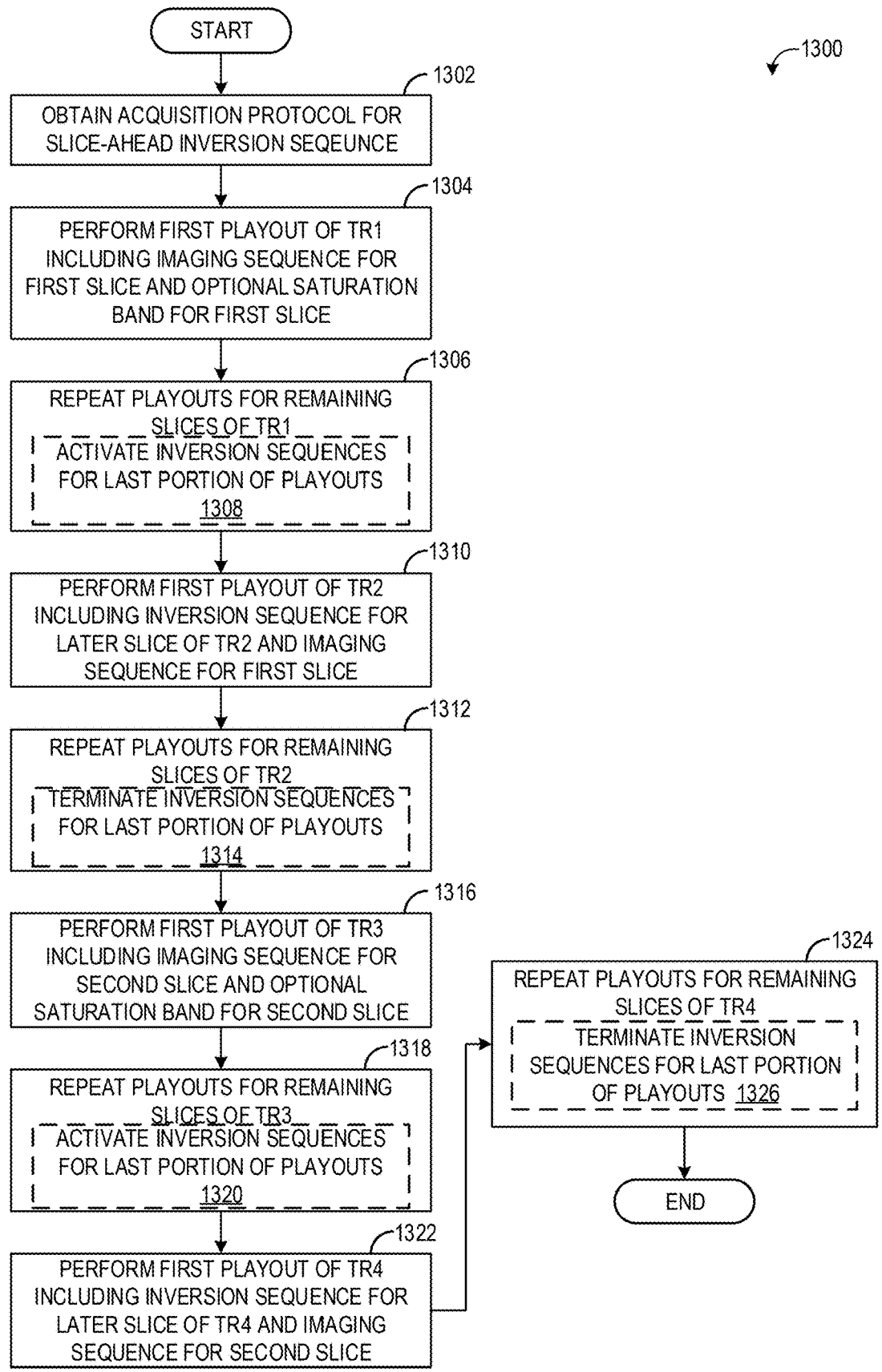
FIG. 13 is a flow chart illustrating an example method for performing the second example slice-ahead inversion sequence.

FIG. 13 illustrates a method 1300 for performing a second example slice-ahead inversion sequence. Method 1300 is a more detailed version of method 1100 and is specific to performing the second example slice-ahead inversion sequence, e.g., of FIG. 8. Thus, method 1300 may be implemented with the MRI apparatus 10 of FIG. 1 and carried out according to instructions stored in non-transitory memory and executed by one or more processors, such as according to instructions stored in memory of controller unit 25 and executed by one or more processors or the controller unit 25. Method 1300 may be carried out in response to initiation of an MRI scan protocol that includes a slice-ahead inversion sequence, and thus may be initiated after a patient has been positioned in a bore of the MRI apparatus.

At 1302, an acquisition protocol for the slice-ahead inversion sequence that is to be performed is obtained. The acquisition protocol may include, among other parameters, the number of slices to be imaged, the slice acquisition order for imaging the slices, and which non-inversion and inversion contrast(s) are to be generated and imaged. At 1304, a first playout of TR1 is performed including an imaging sequence for a first slice of the acquisition order and an optional saturation band sequence for the first slice of the acquisition order. The first slice of the acquisition order is imaged without a prior inversion sequence acting on the first slice, and thus based on the imaging sequence performed (which may be an FSE sequence as shown in FIGS. 5 and 6), a non-inversion contrast may be acquired when the first slice is imaged.

At 1306, the playouts are repeated for the remaining slices of TR1. The acquisition order may specify that only some of the total slices of the volume are to be imaged in TR1, and each of those slices may be imaged via a respective playout that includes an imaging sequence and an optional saturation band sequence. Each sliced imaged during TR1 is imaged without a prior inversion sequence acting on that slice, and thus based on the imaging sequence performed (which may be an FSE sequence as shown in FIGS. 5 and 6), the non-inversion contrast may be acquired when each slice is imaged. As indicated at 1308, inversion sequences are activated for a last portion of the playouts of TR1, such as the last five playouts. Each inversion sequence may prepare inversion contrast for a different slice than the slice imaged in that playout, with the timing of the inversion sequence and later imaging of that slice selected to generate an inversion time (TI), which in the second example slice-ahead inversion sequence may be T2FLAIR.

At 1310, method 1300 includes performing a first playout of TR2 that includes an inversion sequence for a later slice of TR2 (e.g., the sixth slice of the acquisition order) and an imaging sequence for the first slice. At 1312, the playout is repeated for the remaining slices of TR2, though, as indicated at 1314, the inversion sequences are terminated for a last portion of the playouts of TR2. Thus, some of the remaining playouts for TR2 may be identical to the first playout of TR2 (but acting on different slices), with those playouts including an inversion sequence and an imaging sequence. The rest of the remaining playouts for TR2 (e.g., the 10$^{th}$ through 18$^{th}$ playouts of TR2) may include only an imaging sequence. All of the inversion sequences performed in TR2 act on slices imaged during TR2. As each slice has been prepared with an earlier inversion sequence, each slice imaged in TR2 is imaged while exhibiting inversion contrast.

At 1316, method 1300 includes performing a first playout of TR3 that includes an imaging sequence for a second slice and an optional saturation band sequence for the second slice. It is to be appreciated that the second slice may located adjacent the first slice of the acquisition order and thus may be a second slice in location, but may be the 19th slice in the acquisition order. The second slice is imaged without a prior inversion sequence acting on the second slice, and thus based on the imaging sequence performed (which may be an FSE sequence as shown in FIGS. 5 and 6), the non-inversion contrast may be acquired when the second slice is imaged.

At 1318, the playout is repeated for the remaining slices of TR3, such that each playout includes an imaging sequence and an optional saturation band sequence. Each slice imaged during TR3 is imaged without a prior inversion sequence acting on that slice, and thus based on the imaging sequence performed (which may be an FSE sequence as shown in FIGS. 5 and 6), the non-inversion contrast may be acquired when each slice is imaged. As indicated at 1320, inversion sequences are activated for a last portion of the playouts of TR3, such as the last five playouts. Each inversion sequence may prepare inversion contrast for a different slice than the slice imaged in that playout, with the timing of the inversion sequence and later imaging of that slice selected to generate an inversion time (TI), which in the second example slice-ahead inversion sequence may be T2FLAIR.

At 1322, method 1300 includes performing a first playout of TR4 that includes an inversion sequence for a later slice of TR4 and an imaging sequence for the second slice. At 1324, the playout is repeated for the remaining slices of TR4, though, as indicated at 1326, the inversion sequences are terminated for a last portion of the playouts of TR4. Thus, some of the remaining playouts for TR4 may be identical to the first playout of TR4 (but acting on different slices), with those playouts including an inversion sequence and an imaging sequence. The rest of the remaining playouts for TR2 (e.g., the 10th through 18th playouts of TR4) may include only an imaging sequence. All of the inversion sequences performed in TR4 act on slices imaged during TR4. As each slice has been prepared with an earlier inversion sequence, each slice imaged in TR4 is imaged while exhibiting inversion contrast. Method 1300 then ends.

Figure 14:
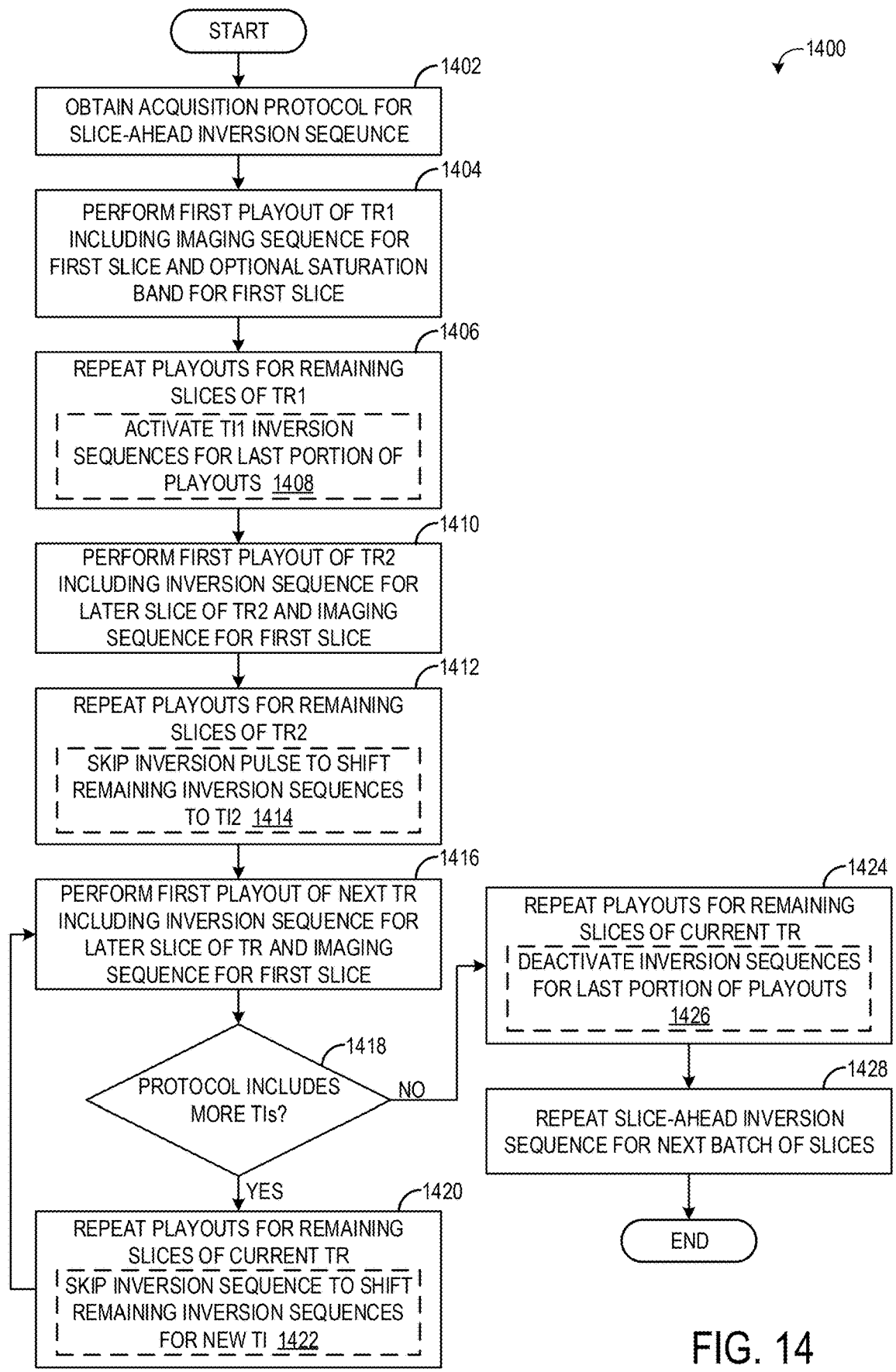
FIG. 14 is a flow chart illustrating an example method for performing the third example slice-ahead inversion sequence.

FIG. 14 illustrates a method 1400 for performing a third example slice-ahead inversion sequence. Method 1400 is a more detailed version of method 1100 and is specific to performing the third example slice-ahead inversion sequence, e.g., of FIGS. 9 and 10. Thus, method 1400 may be implemented with the MRI apparatus 10 of FIG. 1 and carried out according to instructions stored in non-transitory memory and executed by one or more processors, such as according to instructions stored in memory of controller unit 25 and executed by one or more processors or the controller unit 25. Method 1400 may be carried out in response to initiation of an MRI scan protocol that includes a slice-ahead inversion sequence, and thus may be initiated after a patient has been positioned in a bore of the MRI apparatus. Method 1400 may be similar to method 1300, but may include generation of and acquisition of multiple different inversion contrasts.

At 1402, an acquisition protocol for the slice-ahead inversion sequence that is to be performed is obtained. The acquisition protocol may include, among other parameters, the number of slices to be imaged, the slice acquisition order for imaging the slices, and which non-inversion and inversion contrast(s) are to be generated and imaged. At 1404, a first playout of TR1 is performed including an imaging sequence for a first slice of the acquisition order and an optional saturation band sequence for the first slice of the acquisition order. The first slice of the acquisition order is imaged without a prior inversion sequence acting on the first slice, and thus based on the imaging sequence performed (which may be an FSE sequence as shown in FIGS. 5 and 6), a non-inversion contrast may be acquired when the first slice is imaged.

At 1406, the playouts are repeated for the remaining slices of TR1. The acquisition order may specify that only some of the total slices of the volume are to be imaged in TR1, and each of those slices may be imaged via a respective playout that includes an imaging sequence and an optional saturation band sequence. Each sliced imaged during TR1 is imaged without a prior inversion sequence acting on that slice, and thus based on the imaging sequence performed (which may be an FSE sequence as shown in FIGS. 5 and 6), the non-inversion contrast may be acquired when each slice is imaged. As indicated at 1408, inversion sequences are activated for a last portion of the playouts of TR1, such as the last five or seven playouts. Each inversion sequence may prepare inversion contrast for a different slice than the slice imaged in that playout, with the timing of the inversion sequence and later imaging of that slice selected to generate a first inversion time (Ti1).

At 1410, method 1400 includes performing a first playout of TR2 that includes an inversion sequence for a later slice of TR2 (e.g., the sixth or eighth slice of the acquisition order) and an imaging sequence for the first slice. At 1412, the playout is repeated for the remaining slices of TR2, though, as indicated at 1414, one inversion sequence is skipped to shift the timing of the remaining inversion sequences for TR2 in order to generate a second inversion contrast with a second inversion time (Ti2). Thus, some of the remaining playouts for TR2 may be identical to the first playout of TR2 (but acting on different slices), with those playouts including an inversion sequence and an imaging sequence. One playout (e.g., the 19th playout) may include only an imaging sequence. The rest of the remaining playouts for TR2 (e.g., the 20th through 26th playouts of TR2) may include an imaging sequence and an inversion sequence that acts on a later slice to be imaged in a subsequent TR (e.g., with the inversion sequences acting on slices 1-6 of the acquisition order). As each slice imaged in TR2 has been prepared with an earlier inversion sequence, each slice imaged in TR2 is imaged while exhibiting inversion contrast, and specifically the first inversion contrast formed with Ti1.

At 1416, method 1400 includes performing a first playout of the next TR that includes an imaging sequence for the first slice and an inversion sequence for a later slice of that TR. At 1418, method 1400 determines if the acquisition protocol includes more Tis that are to be formed in order to produce and image more inversion contrasts. As explained previously, the slices are first imaged while generating the non-inversion contrast (e.g., during TR1), then imaged while generating a first inversion contrast (e.g., during TR2), and are imaged during a next TR (e.g., TR3) while generating a second inversion contrast. If more than two inversion contrasts are to be generated and imaged, method 1400 proceeds to 1420 to repeat the playout for the remaining slices of the next TR, though, as indicated at 1422, one inversion sequence is skipped to shift the timing of the remaining inversion sequences for the next TR in order to generate a further inversion contrast (e.g., a third inversion contrast) with a further inversion time Tiy (e.g., Ti3). Thus, some of the remaining playouts for the next TR may be identical to the first playout of the next TR (but acting on different slices), with those playouts including an inversion sequence and an imaging sequence. One playout (e.g., the 20th playout) may include only an imaging sequence. The rest of the remaining playouts for TR2 (e.g., the 21st through 26th

playouts) may include an imaging sequence and an inversion sequence that acts on a later slice to be imaged in a subsequent TR (e.g., with the inversion sequences acting on slices 1-5 of the acquisition order). As each slice imaged in the next TR has been prepared with an earlier inversion sequence, each slice imaged in the next TR is imaged while exhibiting inversion contrast, and specifically the second inversion contrast formed with Ti2 or the further inversion contrast formed with Tiy. Method 1400 then returns to 1416 to perform a first playout of the next TR. Thus, the third example slice-inversion sequence may continue to perform TRs with a new inversion contrast generated at each TR by skipping one or more inversion sequences to shift the timing of the subsequent inversion sequences. In some examples, the imaging sequence that is performed may vary across TRs, based on the inversion contrast being imaged. For example, a first inversion contrast may be imaged with an FSE with a late echo view ordering (e.g., T2-weighted) while a second inversion contrast may be imaged with a center-out view ordering (e.g., for T1 weighting). In some examples, other different imaging sequences may be used as long as the imaging sequences have the same duration (though shorter sequences could be prolonged with dead time).

If at 1418 it is determined that the acquisition protocol does not include more inversion contrasts to be generated and imaged (e.g., the current TR is the final TR for the batch of slices), method 1400 proceeds to 1424 to repeat the playout for the remaining slices of the current TR. For example, playouts similar to the first playout of the current TR, performed at 1416, may be performed for the remaining slices, but acting on different slices, with the inversion sequences for the last portion of the playouts inactivated, as indicated at 1426. Once each slice that is to be imaged in the final TR has been prepared with an inversion sequence, the inversion sequences are deactivated. At 1428, method 1400 includes repeating the slice-ahead inversion sequence for the next batch of slices. For example, TR1, TR2, and the subsequent TRs following TR2 may image a first batch of slices of the volume that is to be imaged, such as half of the slices of the volume. The remaining slices of the volume (e.g., the next batch of slices) may be imaged similarly to the first batch, e.g., first while exhibiting non-inversion contrast, then while exhibiting two or more inversion contrasts (e.g., across multiple TRs). Once all the slices of the volume have been imaged so as to generate and image the dictated inversion contrasts, method 1400 ends.

It is to be appreciated that while method 1400 includes the skipping of one inversion sequence per TR to change the inversion contrast for a next TR, more than inversion sequence could be skipped per TR. However, the inversion contrast with the longest TI (e.g., T2FLAIR) is imaged first, followed in succession by inversion contrasts with shorter TIs.

Further, each of methods 1100, 1200, 1300, and 1400 includes playouts with an inversion sequence, an imaging sequence, and/or a saturation band sequence. Any of the inversion sequences performed in methods 1100, 1200, 1300, and 1400 may be the example inversion sequence shown in FIG. 4. Any of the imaging sequences performed in methods 1100, 1200, 1300, and 1400 may be the example imaging sequence shown in FIGS. 5 and 6. Any of the saturation band sequences performed in methods 1100, 1200, 1300, and 1400 may be the example saturation band sequence shown in FIG. 7. However, other inversion sequences, imaging sequence, and/or saturation band sequences may be performed without departing from the scope of this disclosure. While examples have been provided herein for FSE or SSFSE imaging with T2, T2FLAIR, and phase sensitive T1, other implementations are possible, including other TIs for WM-nulled or GM-nulled contrast (e.g., in a single rapid sequence including multiple image contrast acquisitions e.g., NeuroMix). Contrary to other parameter mapping techniques such as fingerprinting, the slice-ahead inversion sequence of the present disclosure may allow for the complete inversion curve to be sampled including the WM and GM nulling points which may be key to identify early pathology. The slice-ahead inversion sequences disclosed herein may also be used for rapid T1 mapping by sampling the inversion curve with an arbitrary number of TIs. If adiabatic inversion pulses are used, the slice-ahead inversion sequence is very robust against B1 inhomogeneity. The slice-ahead inversion sequence could also be used to rapidly acquire DWI data at different TIs, adding T1 as another dimension for tissue modeling.

FIG. 15 shows example images that may be reconstructed from k-space data acquired according to a slice-ahead inversion sequence as disclosed herein. Specifically, the images shown in FIG. 15 are reconstructed from k-space data acquired according to the second example slice-ahead inversion sequence and thus include joint acquisition of T2 and T2FLAIR in a relatively short timeframe (e.g., a total of 32s) where the T2 contrast is acquired in transient state, preparing the magnetization for the subsequent acquisition of T2FLAIR. The k-space data may be acquired with an SSFSE readout, with the acquisition protocol including imaging of 36 slices, each at 4 mm thickness, for a FOV of 24 cm and matrix of 260×220. The k-space data for one slice is reconstructed into a first image 1502 and a second image 1504 using a deep learning-based reconstruction. The first image 1502 is reconstructed from first k-space data of the T2 contrast and the second image 1504 is reconstructed from second k-space data of the T2FLAIR contrast.

FIG. 16 shows a set of images 1600 reconstructed from k-space data acquired according to the third example slice-ahead inversion sequence disclosed herein. The set of images 1600 are images of the same slice. The set of images 1600 includes a first image 1602 and a second image 1604 reconstructed from k-space data acquired of T2 contrast. The set of images 1600 includes 13 additional images, each reconstructed from respective k-space data acquired of different inversion contrasts. For example, a first contrast image 1606 is reconstructed from k-space data of a first inversion contrast, a second contrast image 1608 is reconstructed from k-space data of a second inversion contrast, a third contrast image 1610 is reconstructed from k-space data of a third inversion contrast, and so forth. The k-space data may be acquired with an SSFSE readout, with the acquisition protocol including imaging of 70 slices, each at 2 mm thickness, for a FOV of 24 cm and matrix of 200×200. The images were reconstructed using a deep learning-based reconstruction. Thus, using the third example slice-ahead inversion sequence, for each slice, T2 contrast can be imaged one or more times along with multiple different inversion contrasts (e.g., 13). In the example shown in FIG. 16, all slices were imaged in a total time of 4:10 min. It is to be appreciated that any of the inversion contrasts could be skipped, and that some of the TEs could be left out, to reduce the scan time.

Thus, a new acquisition order (e.g., the slice-ahead inversion sequence) is disclosed herein where a first contrast is acquired without an inversion pulse and afterwards one or more inversion contrasts are acquired. The steady state for each slice across the volume is always maintained, no dummy TR's or other non-acquisition time is introduced, and a homogenous contrast is achieved across the slice stack. Existing techniques for multi TI acquisitions have relied on a 3D inversion pulse and then various 2D readouts at different locations of the inversion curve. The disadvantage of that approach is that the same inversion time for each slice of a volume is not sampled unless as many TIs are sampled as slices in the volume, which is not feasible in most cases. With the new approach disclosed herein, the desired TIs may be flexibly selected (even just one, only the T2 contrast and T2FLAIR) and homogenous volumes are obtained for each TI.

A technical effect of a slice-ahead inversion sequence wherein both non-inverted and inverted contrast are imaged is that delays associated with dummy TRs to prepare the inversion contrast may be reduced or eliminated, thereby increasing scan speed.

In another representation, an MRI sequence to acquire N slices includes an imaging sequence and an inversion sequence, where the imaging sequence acquires k-space data to create an image, wherein the inversion sequence comprises an inversion pulse, wherein one playout includes the inversion sequence and the imaging sequence, wherein a TR comprises more than one playout, wherein the inversion sequence of a playout acts on a different slice than the imaging sequence of that playout, wherein the inverted slice of a former playout is acquired by the imaging sequence of a later playout after the inversion time, wherein at least in the first TR for at least some playouts, the inversion pulse of the inversion sequence is turned off. In some examples, one TR of the MRI sequence comprises playouts only for a subset of the N slices. In some examples, additionally or alternatively, the inversion sequence has a different slice thickness than the imaging sequence. In some examples, additionally or alternatively, the imaging sequence is a FSE sequence. In some examples, additionally or alternatively, the imaging sequence is a DWI sequence. In some examples, additionally or alternatively, the imaging sequence is a single shot sequence.

In another representation, an MRI sequence to acquire N slices includes an imaging sequence and an inversion sequence, wherein the imaging sequence acquires k-space data to create an image, wherein the inversion sequence comprises an inversion pulse, wherein one playout includes the inversion sequence and the imaging sequence, wherein a TR of the MRI sequence comprises more than one playout, wherein the inversion sequence of a playout acts on a different slice than the imaging sequence of that playout, wherein the inverted slice of a former playout is acquired by the imaging sequence of a later playout after a first inversion time, wherein in a later TR, the playout of the inversion sequence is delayed such that the imaging sequence acquires k-space data with a second inversion time. In some examples, one TR of the MRI sequence comprises playouts only for a subset of the N slices. In some examples, additionally or alternatively, the inversion sequence has a different slice thickness than the imaging sequence. In some examples, additionally or alternatively, the imaging sequence is a FSE sequence. In some examples, additionally or alternatively, the imaging sequence is a DWI sequence. In some examples, additionally or alternatively, the imaging sequence is a single shot sequence. In some examples, additionally or alternatively, the TE of the imaging sequence is different for the first inversion time and the second inversion time.

In another representation, an MRI sequence to acquire N slices includes an imaging sequence, an inversion sequence, and a saturation band sequence, wherein the imaging sequence acquires k-space data to create an image, wherein the inversion sequence comprises an inversion pulse, wherein the saturation band sequence comprises a saturation pulse, wherein one playout is comprised of the inversion sequence, the imaging sequence, and the saturation band sequence, wherein a TR comprises more than one playout, wherein the inversion sequence of a playout acts on a different slice than the imaging sequence, wherein the inverted slice of a former playout is acquired by the imaging sequence of a later playout after the inversion time, wherein at least in some playouts, the saturation pulse is activated and the saturation band lies within the scan volume. In some examples, the saturation band is parallel to the imaging slice and centered around the imaging slice. In some examples, additionally or alternatively, the saturation band has a different slice thickness than the imaging sequence. In some examples, additionally or alternatively, the saturation band is parallel to the imaging slice but is centered around a different slice of the slice stack than the imaging slice of the same playout. In some examples, additionally or alternatively, the saturation band has a different slice thickness than the imaging sequence.

In another representation, a method for imaging a patient with a magnetic resonance imaging (MRI) system based on a slice-ahead inversion sequence for a plurality of slices of a scan volume includes performing a first repetition of the slice-ahead inversion sequence with the MRI system, the first repetition including a first plurality of playouts to acquire k-space data of the plurality of slices, wherein each playout of the first plurality of playouts includes a respective imaging sequence, wherein during each imaging sequence, k-space data for a respective slice of the plurality of slices is acquired, and wherein at least a first playout of the first plurality of playouts further includes an inversion sequence that acts on a different slice of the plurality of slices than is imaged during the imaging sequence of the first playout. In a first example of the method, for at least a selected slice of the plurality of slices, the imaging sequence performed to acquire k-space data for the at least the selected slice is performed without an earlier inversion sequence that acts on the at least the selected slice. In a second example of the method, optionally including the first example, each playout of the first plurality of playouts further includes a saturation band sequence. In a third example of the method, optionally including one or both of the first and second examples, each inversion sequence has a different slice thickness than each imaging sequence. In a fourth example of the method, optionally including one or more or each of the first through third examples, each imaging sequence is a fast spin echo (FSE) sequence or a diffusion weighted imaging (DWI) sequence. In a fifth example of the method, optionally including one or more or each of the first through fourth examples, each imaging sequence is a single shot sequence. In a sixth example of the method, optionally including one or more or each of the first through fifth examples, each playout of first plurality of playouts includes an inversion sequence and an imaging sequence, and wherein some of the inversion sequences act on slices imaged in a second repetition of the slice-ahead inversion sequence. In a seventh example of the method, optionally including one or more or each of the first through sixth examples, the method further comprises: performing the second repetition with the MRI system, the second repetition including a second plurality of playouts to acquire k-space data of the plurality of slices, wherein each playout of the second plurality of playouts includes a respective imaging sequence and a respective inversion sequence, wherein during each imaging sequence of the second repetition, k-space data for a respective slice of the plurality of slices is acquired, wherein each inversion sequence of the second repetition acts on a different slice than is imaged during a corresponding imaging sequence of that playout, and wherein some inversion sequences act on slices of a second plurality of slices of the scan volume imaged in a third repetition of the slice-ahead inversion sequence. In an eighth example of the method, optionally including one or more or each of the first through seventh examples, the method further comprises: performing the third repetition with the MRI system, the third repetition including a third plurality of playouts to acquire k-space data of the second plurality of slices, wherein each playout of the third plurality of playouts includes a respective imaging sequence and a respective inversion sequence, wherein during each imaging sequence of the third repetition, k-space data for a respective slice of the second plurality of slices is acquired, and wherein each inversion sequence acts on a different slice than is imaged during a corresponding imaging sequence of that playout. In a ninth example of the method, optionally including one or more or each of the first through eighth examples, the method further comprises: performing a final repetition with the MRI system, the final repetition including a fourth plurality of playouts to acquire k-space data of a third plurality of slices of the scan volume, wherein each playout of the fourth plurality of playouts includes a respective imaging sequence, wherein during each imaging sequence of the final repetition, k-space data for a respective slice of the third plurality of slices is acquired, and wherein only a portion of the playouts of the fourth plurality of playouts includes an inversion sequence. In a tenth example of the method, optionally including one or more or each of the first through ninth examples, for each slice of the plurality of slices, the imaging sequence performed during the first repetition to acquire k-space data for that slice is performed without an earlier inversion sequence that acts on that slice. In an eleventh example of the method, optionally including one or more or each of the first through tenth examples, each inversion sequence acts on a slice of the plurality of slices imaged in a second repetition of the slice-ahead inversion sequence. In a twelfth example of the method, optionally including one or more or each of the first through eleventh examples, the method further comprises: performing the second repetition with the MRI system, the second repetition including a second plurality of playouts to acquire k-space data of the plurality of slices, wherein each playout of the second plurality of playouts includes a respective imaging sequence and a respective inversion sequence, wherein during each imaging sequence of the second plurality of playouts, k-space data for a respective slice of the plurality of slices is acquired, and wherein each inversion sequence acts of the second plurality of playouts on a different slice than is imaged during a corresponding imaging sequence of that playout. In a thirteenth example of the method, optionally including one or more or each of the first through twelfth examples, the inversion sequences are deactivated for a last portion of the second plurality of playouts. In a fourteenth example of the method, optionally including one or more or each of the first through thirteenth examples, the method further comprises: performing a third repetition of the slice-ahead inversion sequence with the MRI system, the third repetition including a third plurality of playouts to acquire k-space data of the plurality of slices, wherein each playout of the third plurality of playouts includes a respective imaging sequence and a respective inversion sequence, wherein during each imaging sequence of the third plurality of playouts, k-space data for a respective slice of the plurality of slices is acquired, and wherein each inversion sequence of the third plurality of playouts acts on a different slice than is imaged during a corresponding imaging sequence of that playout. In a fifteenth example of the method, optionally including one or more or each of the first through fourteenth examples, each imaging sequence performed during the second repetition is inverted by an earlier inversion sequence, wherein a time between each earlier inversion sequence and respective image sequence of the second repetition is a first inversion time. In a sixteenth example of the method, optionally including one or more or each of the first through fifteenth examples, each imaging sequence performed during the third repetition is inverted by an earlier inversion sequence, wherein a time between each earlier inversion sequence and respective image sequence of the third repetition is a second inversion time that is different than the first inversion time.

The disclosure also provides support for a method for a magnetic resonance imaging (MRI) system, comprising: acquiring k-space data with the MRI system according to a slice-ahead inversion sequence that jointly generates a contrast without inversion preparation and one or more inversion contrasts for a plurality of slices in a scan volume of a subject, wherein the k-space data comprises first k-space data of the contrast without inversion preparation acquired during one or more non-inversion repetitions and second k-space data of the one or more inversion contrasts acquired during one or more inversion repetitions, wherein a repetition time for each of the one or more non-inversion repetitions and one or more inversion repetitions is constant, and reconstructing one or more images from the k-space data for each of the plurality of slices. In a first example of the method, the contrast without inversion preparation comprises T2 contrast. In a second example of the method, optionally including the first example, the one or more inversion contrasts comprise T1FLAIR or T2FLAIR. In a third example of the method, optionally including one or both of the first and second examples, the one or more inversion contrasts comprise two or more different inversion contrasts. In a fourth example of the method, optionally including one or more or each of the first through third examples, the contrast without inversion preparation comprises a contrast wherein no longitudinal steady state of magnetization is reached, and wherein the first k-space data includes first k-space data of each slice of the plurality of slices or of only a subset of slices of the plurality of slices. In a fifth example of the method, optionally including one or more or each of the first through fourth examples, the slice-ahead inversion sequence includes a first plurality of imaging sequences performed during a first repetition of the one or more non-inversion repetitions to acquire the first k-space data and a second plurality of imaging sequences performed during a second repetition of the one or more inversion repetitions to acquire the second k-space data. In a sixth example of the method, optionally including one or more or each of the first through fifth examples, at least one of the first plurality of imaging sequences and/or second plurality of imaging sequences is a single shot sequence. In a seventh example of the method, optionally including one or more or each of the first through sixth examples, the slice-ahead inversion sequence includes a first plurality of inversion sequences performed during the first repetition and a second plurality of inversion sequences performed during the second repetition, and wherein for a given slice of the plurality of slices, a first imaging sequence of the first repetition acting on the given slice and a first inversion sequence of the first repetition or the second repetition acting on the given slice generates the one or more inversion contrasts for the given slice. In an eighth example of the method, optionally including one or more or each of the first through seventh examples, the slice-ahead inversion sequence further includes a plurality of slice-selective saturation band sequences, wherein each respective slice-selective saturation band sequence is performed directly after a respective imaging sequence. In a ninth example of the method, optionally including one or more or each of the first through eighth examples, a slice thickness of each respective slice-selective saturation band sequence is different than a slice thickness of the respective imaging sequence. In a tenth example of the method, optionally including one or more or each of the first through ninth examples, a slice location of each respective slice-selective saturation band sequence is different from a slice location of the respective imaging sequence.

The disclosure also provides support for a magnetic resonance imaging (MRI) system configured to image a scan volume of a subject, the MRI system comprising: a set of gradient coils configured to provide magnetic gradients along respective orthogonal directions, a radiofrequency (RF) system configured to transmit RF pulses and receive MR signals representing the scan volume, and a controller configured to control the set of gradient coils and the RF system to perform a slice-ahead inversion sequence that jointly generates a non-inversion contrast and one or more inversion contrasts across one or more non-inversion repetitions and one or more inversion repetitions, wherein during the slice-ahead inversion sequence, the controller acquires k-space data from the MR signals, wherein the k-space data comprises first k-space data of the non-inversion contrast acquired during the one or more non-inversion repetitions and second k-space data of the one or more inversion contrasts acquired during the one or more inversion repetitions, wherein a repetition time for each of the one or more non-inversion repetitions and one or more inversion repetitions is constant. In a first example of the system, the one or more inversion contrasts comprise two or more different inversion contrasts.

The disclosure also provides support for a method for a magnetic resonance imaging (MRI) system, comprising: acquiring k-space data with the MRI system according to a slice-ahead inversion sequence that generates two or more inversion contrasts for a plurality of slices in a scan volume of a subject, wherein the k-space data comprises first k-space data of a first inversion contrast of the two or more inversion contrasts acquired during one or more first inversion repetitions and second k-space data of a second inversion contrast of the two or more inversion contrasts acquired during one or more second inversion repetitions, wherein a repetition time for each of the one or more first inversion repetitions and the one or more second inversion repetitions is constant, and reconstructing two or more images from the k-space data for each of the plurality of slices. In a first example of the method, a first repetition of the one or more first inversion repetitions includes a first plurality of playouts, each playout of the first plurality of playouts including a respective imaging sequence and a respective inversion sequence that acts on a different slice of the plurality of slices than is imaged during the respective imaging sequence of that playout, such that each imaging sequence performed during the first repetition is inverted by an earlier inversion sequence, wherein a time between each earlier inversion sequence and respective image sequence of the first repetition is a first inversion time that results in the first inversion contrast. In a second example of the method, optionally including the first example, each inversion sequence has a different slice thickness than each imaging sequence and/or each imaging sequence is a fast spin echo (FSE) sequence or a diffusion weighted imaging (DWI) sequence. In a third example of the method, optionally including one or both of the first and second examples, a second repetition of the one or more second inversion repetitions includes a second plurality of playouts, each playout of the second plurality of playouts including a respective imaging sequence and a respective inversion sequence that acts on a different slice of the plurality of slices than is imaged during the respective imaging sequence of that playout, such that each imaging sequence performed during the second repetition is inverted by an earlier inversion sequence, wherein a time between each earlier inversion sequence and respective image sequence of the second repetition is a second inversion time, different than the first inversion time, that results in the second inversion contrast. In a fourth example of the method, optionally including one or more or each of the first through third examples, the slice-ahead inversion sequence further generates a non-inversion contrast for the plurality of slices, and wherein the k-space data further includes third k-space data of the non-inversion contrast acquired during one or more non-inversion repetitions. In a fifth example of the method, optionally including one or more or each of the first through fourth examples, the one or more first inversion repetitions and the one or more second inversion repetitions each include a plurality of imaging sequences, wherein the slice-ahead inversion sequence further includes a plurality of slice-selective saturation band sequences performed during one or more of the one or more first inversion repetitions and/or the one or more second inversion repetitions, wherein each respective slice-selective saturation band sequence is performed directly after a respective imaging sequence. In a sixth example of the method, optionally including one or more or each of the first through fifth examples, a slice thickness of each respective slice-selective saturation band sequence is different than a slice thickness of the respective imaging sequence and/or wherein a slice location of each respective slice-selective saturation band sequence is different from a slice location of the respective imaging sequence.

As used herein, the term "approximately" is construed to mean plus or minus five percent of the range unless otherwise specified.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a magnetic resonance imaging (MRI) system, comprising:
   acquiring k-space data with the MRI system according to a slice-ahead inversion sequence that jointly generates a contrast without inversion preparation and one or more inversion contrasts for a plurality of slices in a scan volume of a subject, wherein the k-space data comprises first k-space data of the contrast without inversion preparation acquired during one or more non-inversion repetitions and second k-space data of the one or more inversion contrasts acquired during one or more inversion repetitions, wherein a repetition time for each of the one or more non-inversion repetitions and one or more inversion repetitions is constant; and
   reconstructing one or more images from the k-space data for each of the plurality of slices.

2. The method of claim 1, wherein the contrast without inversion preparation comprises T2 contrast.

3. The method of claim 1, wherein the one or more inversion contrasts comprise T1FLAIR or T2FLAIR.

4. The method of claim 1, wherein the one or more inversion contrasts comprise two or more different inversion contrasts.

5. The method of claim 1, wherein the contrast without inversion preparation comprises a contrast wherein no longitudinal steady state of magnetization is reached, and wherein the first k-space data includes first k-space data of each slice of the plurality of slices or of only a subset of slices of the plurality of slices.

6. The method of claim 1, wherein the slice-ahead inversion sequence includes a first plurality of imaging sequences performed during a first repetition of the one or more non-inversion repetitions to acquire the first k-space data and a second plurality of imaging sequences performed during a second repetition of the one or more inversion repetitions to acquire the second k-space data.

7. The method of claim 6, wherein at least one of the first plurality of imaging sequences and/or second plurality of imaging sequences is a single shot sequence.

8. The method of claim 6, wherein the slice-ahead inversion sequence includes a first plurality of inversion sequences performed during the first repetition and a second plurality of inversion sequences performed during the second repetition, and wherein for a given slice of the plurality of slices, a first imaging sequence of the first repetition acting on the given slice and a first inversion sequence of the first repetition or the second repetition acting on the given slice generates the one or more inversion contrasts for the given slice.

9. The method of claim 6, wherein the slice-ahead inversion sequence further includes a plurality of slice-selective saturation band sequences, wherein each respective slice-selective saturation band sequence is performed directly after a respective imaging sequence.

10. The method of claim 9, wherein a slice thickness of each respective slice-selective saturation band sequence is different than a slice thickness of the respective imaging sequence.

11. The method of claim 9, wherein a slice location of each respective slice-selective saturation band sequence is different from a slice location of the respective imaging sequence.

12. A magnetic resonance imaging (MRI) system configured to image a scan volume of a subject, the MRI system comprising:
    a set of gradient coils configured to provide magnetic gradients along respective orthogonal directions;
    a radiofrequency (RF) system configured to transmit RF pulses and receive MR signals representing the scan volume; and
    a controller configured to control the set of gradient coils and the RF system to perform a slice-ahead inversion sequence that jointly generates a non-inversion contrast and one or more inversion contrasts across one or more non-inversion repetitions and one or more inversion repetitions, wherein during the slice-ahead inversion sequence, the controller acquires k-space data from the MR signals, wherein the k-space data comprises first k-space data of the non-inversion contrast acquired during the one or more non-inversion repetitions and second k-space data of the one or more inversion contrasts acquired during the one or more inversion repetitions, wherein a repetition time for each of the one or more non-inversion repetitions and one or more inversion repetitions is constant.

13. The MRI system of claim 12, wherein the one or more inversion contrasts comprise two or more different inversion contrasts.

14. A method for a magnetic resonance imaging (MRI) system, comprising:
    acquiring k-space data with the MRI system according to a slice-ahead inversion sequence that generates two or more inversion contrasts for a plurality of slices in a scan volume of a subject, wherein the k-space data comprises first k-space data of a first inversion contrast of the two or more inversion contrasts acquired during one or more first inversion repetitions and second k-space data of a second inversion contrast of the two or more inversion contrasts acquired during one or more second inversion repetitions, wherein a repetition time for each of the one or more first inversion repetitions and the one or more second inversion repetitions is constant; and
    reconstructing two or more images from the k-space data for each of the plurality of slices.

15. The method of claim 14, wherein a first repetition of the one or more first inversion repetitions includes a first plurality of playouts, each playout of the first plurality of playouts including a respective imaging sequence and a respective inversion sequence that acts on a different slice of the plurality of slices than is imaged during the respective imaging sequence of that playout, such that each imaging sequence performed during the first repetition is inverted by an earlier inversion sequence, wherein a time between each earlier inversion sequence and respective image sequence of the first repetition is a first inversion time that results in the first inversion contrast.

16. The method of claim 15, wherein each inversion sequence has a different slice thickness than each imaging sequence and/or each imaging sequence is a fast spin echo (FSE) sequence or a diffusion weighted imaging (DWI) sequence.

17. The method of claim 15, wherein a second repetition of the one or more second inversion repetitions includes a second plurality of playouts, each playout of the second plurality of playouts including a respective imaging sequence and a respective inversion sequence that acts on a different slice of the plurality of slices than is imaged during the respective imaging sequence of that playout, such that each imaging sequence performed during the second repetition is inverted by an earlier inversion sequence, wherein a time between each earlier inversion sequence and respective image sequence of the second repetition is a second inversion time, different than the first inversion time, that results in the second inversion contrast.

18. The method of claim 14, wherein the slice-ahead inversion sequence further generates a non-inversion contrast for the plurality of slices, and wherein the k-space data further includes third k-space data of the non-inversion contrast acquired during one or more non-inversion repetitions.

19. The method of claim 14, wherein the one or more first inversion repetitions and the one or more second inversion repetitions each include a plurality of imaging sequences, wherein the slice-ahead inversion sequence further includes a plurality of slice-selective saturation band sequences performed during one or more of the one or more first inversion repetitions and/or the one or more second inversion repetitions, wherein each respective slice-selective saturation band sequence is performed directly after a respective imaging sequence.

20. The method of claim 19, wherein a slice thickness of each respective slice-selective saturation band sequence is different than a slice thickness of the respective imaging sequence and/or wherein a slice location of each respective slice-selective saturation band sequence is different from a slice location of the respective imaging sequence.

* * * * *